(12) United States Patent
Nayak et al.

(10) Patent No.: US 12,130,863 B1
(45) Date of Patent: Oct. 29, 2024

(54) ARTIFICIAL INTELLIGENCE SYSTEM FOR EFFICIENT ATTRIBUTE EXTRACTION

(71) Applicant: Amazon Technologies, Inc., Seattle, WA (US)

(72) Inventors: Shrikant G Nayak, Karnataka (IN); Sathya Prakash Podila Venkata Subramanya, Karnataka (IN); Divya Nalam, Karnataka (IN); Vijay Daniel Manason, Karnataka (IN); Valluri Subbanna Chowdary, Karnataka (IN)

(73) Assignee: Amazon Technologies, Inc., Seattle, WA (US)

( * ) Notice: Subject to any disclaimer, the term of this patent is extended or adjusted under 35 U.S.C. 154(b) by 586 days.

(21) Appl. No.: 17/107,633

(22) Filed: Nov. 30, 2020

(51) Int. Cl.
  *G06F 16/80* (2019.01)
  *G06F 16/84* (2019.01)
  *G06F 18/214* (2023.01)
  *G06F 40/154* (2020.01)
  *G06F 40/16* (2020.01)
  *G06N 5/02* (2023.01)
  *G06N 20/20* (2019.01)

(52) U.S. Cl.
  CPC .......... *G06F 16/86* (2019.01); *G06F 18/2148* (2023.01); *G06F 40/154* (2020.01); *G06F 40/16* (2020.01); *G06N 5/02* (2013.01); *G06N 20/20* (2019.01)

(58) Field of Classification Search
  CPC ..................................................... G06F 16/86
  See application file for complete search history.

(56) References Cited

U.S. PATENT DOCUMENTS

| | | | | |
|---|---|---|---|---|
| 10,311,058 | B1* | 6/2019 | Kumar | G06N 3/08 |
| 11,138,249 | B1* | 10/2021 | Tosik | G06F 16/3347 |
| 11,636,252 | B1* | 4/2023 | Myers | G06F 40/143 |
| | | | | 715/234 |
| 2018/0032897 | A1* | 2/2018 | Cao | G06N 20/10 |
| 2018/0349388 | A1* | 12/2018 | Skiles | G06F 16/358 |
| 2019/0043127 | A1* | 2/2019 | Mahapatra | G06F 16/9535 |
| 2019/0295114 | A1* | 9/2019 | Pavletic | G06F 18/214 |
| 2019/0318212 | A1* | 10/2019 | Govrin | G06T 3/40 |
| 2020/0151246 | A1* | 5/2020 | Mwarabu | G06F 40/216 |
| 2020/0151591 | A1* | 5/2020 | Li | G06N 3/08 |
| 2020/0160190 | A1* | 5/2020 | Swamy | G06F 40/279 |
| 2020/0160215 | A1* | 5/2020 | Kotnis | G06N 20/10 |
| 2020/0211305 | A1* | 7/2020 | Bender | G06N 5/02 |
| 2021/0098133 | A1* | 4/2021 | Chowdhry | G16H 50/70 |
| 2021/0157983 | A1* | 5/2021 | Kalluri | G06F 40/216 |

(Continued)

*Primary Examiner* — Mohammad S Rostami
(74) *Attorney, Agent, or Firm* — Robert C. Kowert; Kowert, Hood, Munyon, Rankin & Goetzel, P.C.

(57) ABSTRACT

Results of applying a set of voting rules to a target corpus of documents are used to obtain a set of derived probabilistic labels indicating the probabilities of the presence of a particular attribute within the documents' constituent objects. A machine learning model is trained to identify a candidate portion of a document from which a value of the attribute is to be extracted. The training data for the model includes learned representations obtained from paths of constituent objects, and the corresponding derived labels. A proposed value for the attribute, obtained based on an assigned attribute value presence probability score for an individual constituent object from a selected candidate portion of a document, is provided.

20 Claims, 12 Drawing Sheets

(56) References Cited

U.S. PATENT DOCUMENTS

| | | | | |
|---|---|---|---|---|
| 2021/0201013 | A1* | 7/2021 | Makhija | G06V 30/414 |
| 2021/0201169 | A1* | 7/2021 | Fung Moo | G10L 15/1822 |
| 2021/0304065 | A1* | 9/2021 | Todd | G06N 5/02 |
| 2022/0019741 | A1* | 1/2022 | Roy | G06F 40/30 |
| 2022/0058227 | A1* | 2/2022 | Balakrishnan | G06Q 30/0627 |
| 2022/0067287 | A1* | 3/2022 | Cobb | G06F 40/205 |
| 2022/0076007 | A1* | 3/2022 | Rout | G06V 20/20 |
| 2022/0164397 | A1* | 5/2022 | Escalona | G06F 40/20 |
| 2022/0253611 | A1* | 8/2022 | Galitsky | G06N 5/01 |
| 2022/0284392 | A1* | 9/2022 | Chandrasekhar | G06F 16/258 |
| 2023/0153434 | A1* | 5/2023 | Zeppenfeld | G06N 20/20 726/22 |

* cited by examiner

ARTIFICIAL INTELLIGENCE SYSTEM FOR EFFICIENT ATTRIBUTE EXTRACTION

BACKGROUND

Records for many kinds of large-scale business applications are often stored in electronic form. For example, a global store may use electronic records containing text attributes (which can also include numeric attributes) as well as non-text attributes (such as images) to store information about millions of items that are available for sale, and publish at least some portions of the item descriptions contained in the electronic records to enable customers to select and purchase the items.

Although some organizations may attempt to standardize the manner in which information about entities is provided for inclusion in their internal databases, such standardized approaches may not always succeed. For example, in environments in which a variety of vendors or product suppliers sell their items through a common re-seller, different vendors may use respective approaches towards describing items. In some cases, while a given vendor might provide values of some essential attributes such as an item name, color, size in the case of apparel, etc., values of some other attributes (such as instructions about how the item of apparel should be cleaned or ironed) which may considered less essential may be omitted, leading to incomplete records in the database used by the re-seller. However, for many customers or potential customers of the items, the missing information may be of interest.

Often, in scenarios in which some entity records stored at an organization are incomplete, it may be possible to find auxiliary sources of data from which values of the missing attributes can in principle be retrieved. For example, in the re-seller scenario, the manufacturers of the items may have their own web sites which may include authoritative and complete information about the items. However, the manner in which the information is presented (e.g., the organization of the web pages which contain the missing attribute values) may differ from one auxiliary data source to another, and even within different parts of the same auxiliary data source. Furthermore, it may be hard to automate the process of extracting missing attribute values using supervised machine learning techniques, as the manual labeling of sufficient examples may be impractical. As a result, extracting missing attribute values remains a challenging technical problem.

Figure 1:
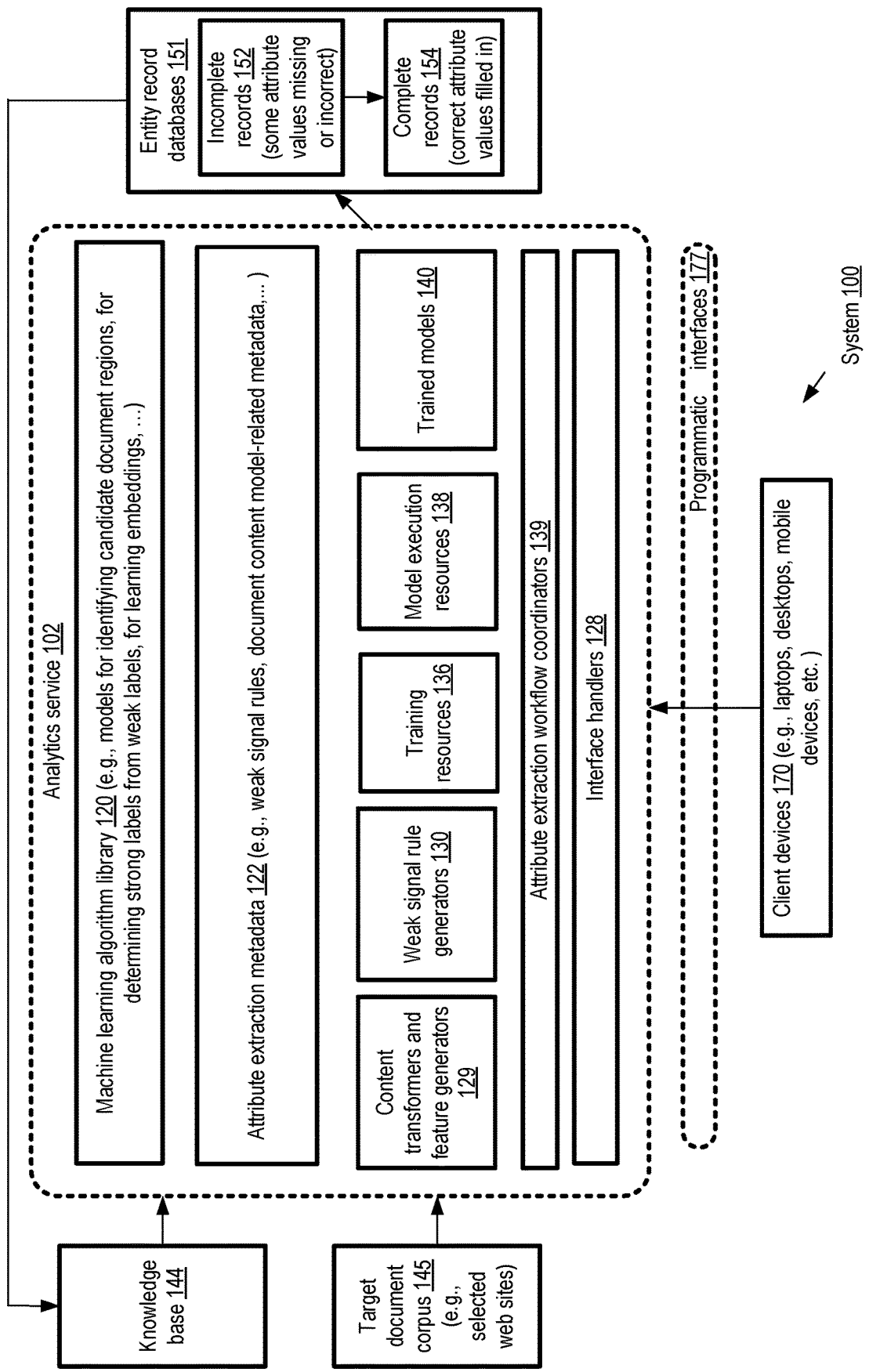
FIG. 1 illustrates an example system environment in which machine learning techniques which utilize weak signals may be employed for attribute extraction from a target document corpus at an analytics service, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for efficiently extracting values of attributes from publicly accessible document corpuses (e.g., web pages of one or more web sites) using a knowledge base and weak signals of attribute value presence information, without requiring manual annotation or labeling of data of the document corpuses. The proposed techniques may be used, for example, to automatically fill gaps in entity records stored for a variety of applications, such as the catalogs of large-scale store web sites, by extracting missing attribute values from auxiliary sources such as (in the case of catalogs) item manufacturers' web sites. At a high-level, the methodology disclosed herein comprises the following high-level steps: identifying automated rules that can be used to extract weak signals of attribute value presence in documents, extracting such weak signals, automatically generating strong labels from the weak signals, training machine learning models to identify document portions likely to contain values of targeted attributes, and extracting the targeted attribute values from objects selected from within the identified regions using an object-level ranking algorithm.

An indication or "signal" that a document (or a portion of a document) contains a value of an attribute may be said to be "weak" if it is non-definitive or non-conclusive. For example, a rule to generate such a signal may comprise the equivalent if the following: if the text of a document which is about an apparel item contains tokens representing an example of the pattern "[string][:][number-between-0-and-100][%], [number-between-0-and-100][%]" (ignoring white space), such as "contains: 90% cotton, 10% nylon", then it is likely (e.g., with some level of confidence) but not certain that the document contains a value for a "fabric" attribute of the apparel item. In effect, a rule that results in a weak signal being generated may be considered a single vote as to whether the document contains a value for the targeted attribute. Votes from several different rules may have to be aggregated in some way to arrive at a stronger conclusion about the presence or absence of the attribute value; some negative votes (suggesting that the attribute value is unlikely to be present) may tend to cancel out other positive votes (suggesting that the attribute value is likely to be present), for example. Because human annotation of thousands of documents is usually impracticable, combining multiple weak signals offers one automated way of labeling documents for the presence of targeted attribute values. In the proposed methodology, at least some rules for extracting attribute information may be generated automatically in various embodiments, e.g., based on entries of a knowledge base containing values of target attributes and/or based on structural analysis of documents of a target corpus.

The documents of a target corpus (such as web pages of one or more web sites of a manufacturer of items represented in a store catalog) from which attribute values are to be extracted may usually be structured according to a standard hierarchical content model, such as the Document Object Model (DOM) of the World Wide Web Consortium (W3C). In various embodiments, application programming interfaces (APIs) and tools associated with the content model used for the corpus documents may be utilized to determine constituent objects (e.g., DOM nodes) and their hierarchical paths within the documents (e.g., XPaths in the case of DOM nodes), and at least a portion of the attribute extraction methodology may rely on such structural analysis. For example, in one embodiment, some of the rules for generating weak signals may be based on identifying generalized paths to attribute value locations within a few selected documents of the corpus, and then determining whether other documents of the corpus also contain constituent objects with such paths. Also, constituent object path information may be used to identify relevant portions of documents which are most likely to contain values of target attributes, and so on. Learned representations, such as vector embeddings, based on constituent object paths as well as constituent object content may be used to extract the values of attributes from the target corpus in various embodiments. A number of different machine learning models may be employed at various stages of the methodology, for example to generate the strong labels from the weak signals, to learn embeddings, to identify relevant regions, and so on. In scenarios in which the target corpus comprises a number of different web sites (or other types of data sources), at least some of the rules identified for weak signals may be web site agnostic or data source agnostic; e.g., the same rule may be applied equally effectively to many different web sites.

As one skilled in the art will appreciate in light of this disclosure, certain embodiments may be capable of achieving various advantages, including some or all of the following: (a) substantially reducing the computing, memory, storage, networking and other resources utilized to determine missing or incorrect values of a collection of entity records, (b) eliminating the need for manual labeling of data used to train machine learning models utilized in attribute extraction, (c) improving the user experience of customers of web sites such as large-scale stores, e.g., by enhancing search and customer support capabilities and providing more complete and reliable information about entities whose information is accessible via the web sites, and/or (d) improving the user experience of sources of entity information such as sellers of items accessible vis large-scale stores, e.g., by reducing the amount of detailed information the sources are required to provide.

According to some embodiments, a system may comprise one or more computing devices, e.g., of an analytics service of a provider network or cloud computing environment. The computing devices may include instructions that upon execution on or across the one or more computing devices cause the one or more computing devices to obtain an indication of, and access to, a knowledge base. The knowledge base may comprise numerous entries, each containing a respective value of one or more attributes of entities of interest for a particular problem domain. For example, the knowledge base may comprise a subset of entries of a database maintained for a web-based or brick-and-mortar store, containing information about items available at the store. The computing devices may identify a plurality of automated rules (also referred to as voting rules) to obtain respective non-definitive or weak signals of the presence, within a target corpus comprising a plurality of documents (such as publicly-accessible web pages of relevant web sites), of values of one or more attributes of entities not represented in the knowledge base. The knowledge base itself may contain at least a few example values of the attributes of interest. At least some of the documents of the target corpus may comprise a respective set of constituent objects arranged according to a hierarchical content model (such as the W3C DOM) in various embodiments. A variety of automated rules may be identified in different embodiments, including for example rules based on matching text patterns, rules based that indicate the likely absence (rather than the likely presence) of attribute values, rules that are based on enumerations of common values for target attributes, rules based on identifying generalized paths to documents' constituent objects, and so on. In at least some embodiments, one or more of the automated voting rules may be generated automatically, e.g., based on analysis of example values of the attributes available from the knowledge base, based on structural analysis of target corpus documents, and so on.

Using a set of non-definitive signals obtained by applying the automated voting rules to a selected set of documents of the target corpus, an initial label matrix may be populated in various embodiments. A particular entry of the initial label matrix may indicate a proposed label associated with the presence of a value of a particular attribute of an entity within a particular constituent object of a particular document of the target corpus. For example, in one implementation a label could take on one of the set of values "Present, Absent, Undecided" (or a numeric representation thereof, in which "1" corresponds to "Present", "0" corresponds to "Absent" and "−1" (or null) corresponds to "Undecided"). In this scheme, the matrix entry for a given rule R1 and constituent object CO1 of a document D1 with respect to an attribute Attr1 would be "Present" if applying R1 indicates that CO1 is likely to contain a value of Atrr1, "Absent" if applying R1 indicates that CO1 is unlikely to contain a value of Atrr1, and "Undecided" if applying R1 indicates that a decision regarding the likelihood of CO1 containing a value of Atrr1 cannot be made using R1 alone. In some embodiments, numeric values within a range may be used instead of just three settings to indicate the likelihood of the presence/absence of the attribute value—e.g., on a scale from 0.0 to 1.0, a real numbers closer to 1.0 may be used to indicate the likely presence of the attribute value, and real numbers closer to 0.0 may be used to indicate the likely absence of the attribute value.

In at least some embodiments, a set of derived probabilistic labels may be generated, using a first machine learning model to which the initial label matrix is provided as input. A given derived probabilistic label may indicate an aggregated or computed probability (based on the votes or preliminary labels obtained from the automated rules) of a presence of a value of a particular attribute within a constituent object represented in the initial label matrix. In effect, the first machine learning model may perform statistical analysis of the extent of agreement or disagreement among the different preliminary labels for a given constituent object to determine a final probabilistic label for the constituent object. The problem of deriving the probabilistic labels from the initial label matrix may be formulated as a matrix factorization problem in the first machine learning model in some embodiments, in which the real or true values are recovered from the initial label matrix (assumed to be noisy) using stochastic gradient descent.

A second machine learning model may then be used to identify a particular region (or several regions) of a document as a candidate region from which a value of the particular attribute can be extracted in various embodiments. In the case of web pages, for example, such a region could comprise a bullet list or table within a web page, which in turn may contain many list items or table rows, any of which may potentially contain the attribute value of interest. The second machine learning model may be trained using a training data set comprising (a) embeddings based on respective paths, defined according to the hierarchical content model, of at least some constituent objects for which the derived probabilistic labels were obtained and (b) the set of derived probabilistic labels themselves. In some embodiments, the second machine learning model may comprise a classification model, such as a classifier which used a logistic regression algorithm. In one embodiment, preparation of the training data set for the second machine learning model may comprise transforming a path of a DOM node based on corresponding Cascading Style Sheets (CSS) selector values.

In some embodiments, the constituent objects within the candidate region(s) (e.g., individual bullet list items or table rows in the web page example) may be ranked relative to one another based on estimated probabilities of their containing the attribute value. For example, in one embodiment, respective attribute value presence probability scores may be assigned to individual constituent objects in a candidate region, based at least in part on a similarity analysis between learned embeddings of (a) one or more example values of the particular attribute which are present in the knowledge base and (b) content of the constituent objects. A proposed value for the target attribute may then be extracted from a highly ranked or high-scoring constituent object of a candidate region in various embodiments. The proposed value may be provided to one or more destinations in various embodiments, e.g., to a client of an analytics service who had submitted a request for attribute extraction, to a downstream program which stores the extracted value to fill out missing information stored about the parent entity for which the attribute value was extracted, and so on.

According to some embodiments, as suggested earlier, the techniques described above may be performed at a network-accessible analytics service of a provider network, e.g., in response to one or more programmatic requests directed to the analytics service by its clients. The term "provider network" (sometimes simply called a "cloud") refers to a large pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. The resources of a provider network may in some cases be distributed across multiple data centers, which in turn may be distributed among numerous geographical regions (e.g., with each region corresponding to one or more cities, states or countries). For example, a cloud provider network can be formed as a number of regions, where a region is a geographical area in which the cloud provider clusters data centers. Each region can include two or more availability zones connected to one another via a private high speed network, for example a fiber communication connection. An availability zone refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet or a cellular communication network). A provider network may include numerous network-accessible services, such as a virtualized computing service (VCS), one or more storage services, database services and the like, as well as an analytics service (which may also be referred to as a machine learning service). A VCS may also be referred to as an elastic compute service, virtual machines service, computing cloud service, compute engine, and/or cloud compute in various implementations.

Example System Environment

FIG. 1 illustrates an example system environment in which machine learning techniques which utilize weak signals may be employed for attribute extraction from a target document corpus at an analytics service, according to at least some embodiments. As shown, system 100 comprises resources and artifacts of an analytics service 102, including a machine learning algorithm library 120, attribute extraction metadata 122, content transformers and feature generators 129, weak signal rule generators 130, training resources 136, model execution resources 138, trained models 140, interface handlers 128, and attribute extraction workflow coordinators 139. Each of the subcomponents of the analytics service 102 may be implemented using hardware and/or software of one or more computing devices in various embodiments.

The analytics service 102 may implement one or more programmatic interfaces 177, such as web-based consoles, command-line tools, application programming interfaces (APIs), graphical user interfaces and the like. Such interfaces may be utilized by clients of the analytics service to submit various types of messages or requests pertaining to the extraction of entity attributes from a target document corpus 145 (such as a set of publicly-accessible web sites, or web sites to which access has been explicitly granted to the analytics service), and receive corresponding responses from the analytics service. Requests or messages may be transmitted, for example, from a variety of client devices 170 in different embodiments, such as desktops, laptops, mobile devices and the like. The requests may be received by interface handlers 128 in the depicted embodiment. The interface handlers 128 may then transmit internal versions of the requests/messages to other subcomponents of the analytics service 102, receive responses from the other subcomponents and pass them on to the clients via the programmatic interfaces 177.

In the depicted embodiment, one of the tasks for which the analytics service is employed by its clients may comprise enhancing the completeness or quality of one or more entity record databases 151, e.g., by automatically extracting missing values of attributes of one or more entity records from the target corpus. Using the extracted values, incomplete records 152 (which may have some attribute values missing, or inaccurate values for some missing attributes) may be transformed into complete records 154 with correct automatically-extracted attribute values filled in. Attribute values extracted from a subset of the entity record databases may in turn be used to populate a knowledge base 144, which contains entries indicating the values of attributes of various entities. Knowledge base 144 (which may also be referred to as a database in some embodiments) may, for example, comprise example values of some number of attributes which are sometimes not supplied initially by the sources of the incomplete records 152; such attributes may be referred to as "tail attributes", as discussed below in further detail.

In various embodiments, a client of the analytics service 102 may use programmatic interfaces 177 to supply information about the knowledge base 144 (e.g., including access permissions or credentials needed, if any), the target document corpus 145 (e.g., including the URIs (Uniform Resource Identifier) from which contents of the target document corpus can be obtained, any permissions/credentials needed for the target document corpus), and/or the names of target attributes for which values are to be extracted from the target document corpus. Using the provided information, a plurality of automated rules to obtain respective non-conclusive signals of the presence of values of target attributes in documents within the target corpus may be identified or generated (e.g., by weak signal rule generators 130) in some embodiments. At least some of the documents of the target corpus may be structured according to a hierarchical content model such as the W3C DOM in the depicted embodiment. Information about the content model may be obtained (e.g., by examining the documents accessible from the corpus, or via the programmatic interfaces 177 from a client) and stored in the attribute extraction metadata 122.

In some embodiments, several different types of rules for obtaining the weak or non-definitive signals may be identified or generated. The set of rules, which may vary from one attribute to another in some cases, may include, for example (a) text pattern based rules (b) attribute absence indicator rules, (c) enumeration based rules, and (d) rules referred to as weak classification-based rules, which rely on identifying generalized paths of example constituent objects containing target attribute values. In some embodiments, different sets of rules may be generated for different portions of the target corpus—for example, if two web sites of electronics manufacturers structure their web pages in different ways, different rules may be identified to extract weak signals regarding the same attribute (e.g., the amount of memory available in a portable computing device). Other rules may agnostic with respect to the different types of target corpus data sources (e.g., the same rule may be applied equally effectively to numerous web sites). Weak signal rules may be stored as part of the attribute extraction metadata 122 in the depicted embodiment. Further details and examples pertaining to the automated rules for weak signals are provided below.

Using the automated rules, documents from the target corpus may be analyzed in various embodiments, e.g., by attribute extraction workflow coordinators 139, and an initial label matrix representing the documents analyzed may be populated for a given target attribute. Weak signals obtained from individual ones of the rules for individual ones of the constituent objects of the various documents may be used to generate respective entries of the initial label matrix. A given matrix entry may in effect indicate a vote (the equivalent of "yes, the attribute value is probably present", "no, the attribute value is probably not present" or "it is not clear whether the attribute value is present or not") for the presence or absence of the attribute's value in the corresponding constituent object. In some embodiments, data structures other than matrices may be used for the initial labels.

Statistical analysis of the extent of agreements or disagreements among the different weak signals or votes represented in the initial label matrix may be performed in various embodiments to determine a set of stronger derived probabilistic labels for each constituent object. In at least some embodiments, a first machine learning model from library 120 may be employed for the derivation of the probabilistic labels. A given derived probabilistic label may represent an estimated probability (based on considering all the pertinent available votes or weak signals available) of the presence of a value of a particular attribute within a particular constituent object represented in the initial label matrix.

In at least some embodiments, a second machine learning model from library 120 may be employed to identify, for a particular attribute, one or more portions or regions of a document (e.g., a table, paragraph or bullet list within a web page) as a candidate portion from which a value of the particular attribute can be extracted. The second machine learning model may be trained in some embodiments at the analytics service (e.g., at selected training resources 136) using a training data set comprising (a) embeddings based on respective paths, defined according to the hierarchical content model used for the documents, of at least some constituent objects for which the derived probabilistic labels were obtained and (b) the set of derived probabilistic labels. In one embodiment, the second machine learning model may comprise a logistic regression model. In at least some embodiments, one or more feature engineering tasks (involving, for example, the substitution of DOM node path elements by corresponding CSS selector values, pruning the paths, etc.) may be performed for the training of the second machine learning model using content transformers and feature generators 129.

One intuition behind the narrowing the likely location of an attribute value to a particular region or subsection of the document is that in many cases, structures such as tables or lists may be used to provide attribute values in the documents, but the relative position of any particular attribute within the structure may vary. For example, one web site of the target corpus may have the camera memory size for a particular cell phone from a particular manufacturer displayed in the third row of a table of specifications of the particular cell phone, while another web site of the target corpus may have the camera memory size for a different cell phone from a different manufacturer displayed in the fifth row of a table of specifications of the particular cell phone. Another factor in the narrowing of the likely location of the attribute value within the document is that only a subset of regions or portions of the documents usually contain authoritative values of attributes, even though the attribute values may be mentioned in other parts of the document. For example, if a web page of a manufacturer's web site contains a "product specifications" table for an item, and also allows customers to provide reviews or comments regarding the item, the information within the product specifications section is likely to be more accurate than at least some of the information discussed in the comments or reviews. Trained versions 140 of the machine learning models may be stored at the analytics service in the depicted embodiment, and executed as needed at model execution resources 138 for different attribute extraction requests submitted by clients.

In at least some embodiments, a given candidate region or document identified using the second machine learning model for a given target attribute may contain numerous constituent objects, several of which may in principle contain the value of the target attribute. In order to narrow down the search further to a single constituent object, respective attribute value presence probability scores may be assigned to individual ones of the constituent objects in a candidate region in various embodiments. This step may also take advantage of the existing examples of the attribute values in the knowledge base 144 in at least one embodiment. For example, a similarity analysis algorithm (e.g., obtained from library 120) may be executed to determine the similarity between learned representations or embeddings of (a) one or more example values of the target attribute of interest which are present in the knowledge base and (b) content of the one or more constituent objects of the candidate region. In at least some embodiments, content transformers and feature generators 129 may be employed during this phase of the analysis as well, e.g., in removing stop words, changing cases, etc. in the contents of the constituent objects.

The constituent object (or objects) whose learned representations are found to be most similar to those of the example values from the knowledge base may be selected, and the value of the target attribute may be extracted from it (e.g., by parsing the constituent object if needed). By transforming the contents of the example values and the constituent objects, semantic similarities between the two types of data being compared may be determined even if the raw content differs substantially. For example, if the example values from the knowledge base 144 contain the words "blue" and "green" but not "purple", and a constituent object of the candidate region contains the word "purple", the embedding for "purple" may be found to be similar to the embeddings of "blue" and "green" because all three words represent colors, so the attribute value "purple" may be extracted for a color attribute. The extracted value may then be provided to the client at whose request the value was extracted, and/or to downstream programs which can automatically modify the contents of entity records databases. Such downstream programs may, for example, use the extracted value to fill out an incomplete record 152, and convert it into a complete record 154. Additional details regarding various aspects of the automated attribute extraction methodology described at a high level in the content of FIG. 1 are provided below.

Examples of "Head" and "Tail" Attributes

Figure 2:
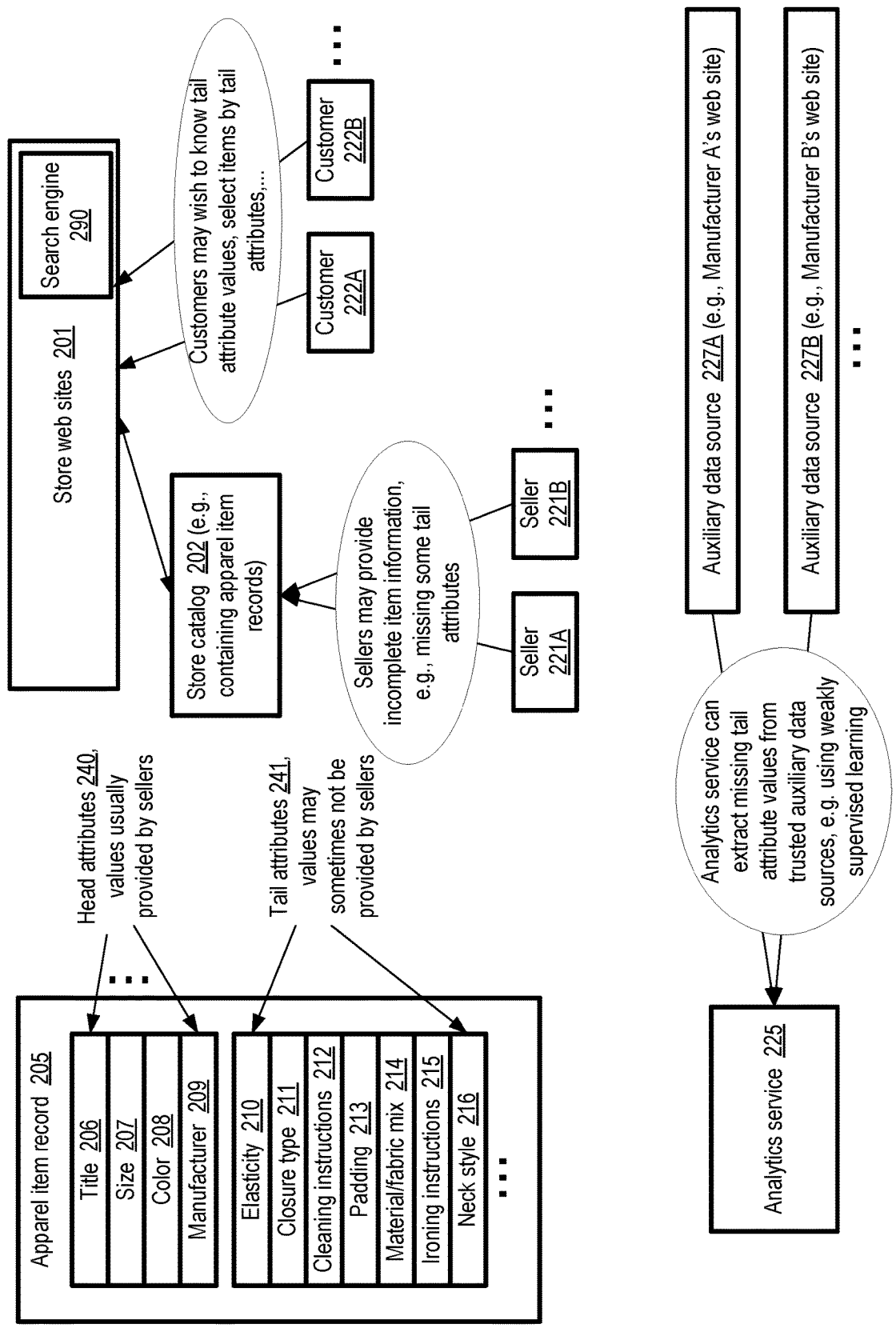
FIG. 2 illustrates examples of attributes of apparel-related records which may be extracted from auxiliary data sources via an analytics service, according to at least some embodiments.

FIG. 2 illustrates examples of attributes of apparel-related records which may be extracted from auxiliary data sources via an analytics service, according to at least some embodiments. In the depicted example scenario, a store catalog 202 associated with a set of store web sites 201 comprises records representing respective apparel items. A given apparel item records 205 may contain values for numerous attributes, such as title 206 of the item, size 207, color 208, manufacturer 209, the degree of elasticity 210 of some portion or all of the apparel item (indicating whether the item can be stretched if needed), closure type 211 (e.g., whether the item has a zipper, buttons, hooks etc. and if so, details about the closure type), cleaning instructions 212 (e.g., "wash in cold water only", padding information 213 (e.g., "thickly padded at elbows"), the mix of materials/fabrics 214 (e.g., 33% cotton. 67% wool), ironing instructions 215, neck style 216 (e.g., V-neck or rounded neck) for upper-body apparel, etc. Not all the attributes may be applicable to each of the apparel items of the catalog 202.

A subset of the attributes, such as title 206, size 207, color 208, and manufacturer 209 may be considered more important than the others from the perspective of both the store operator and the sellers 221 (e.g., seller 221A or seller 221B) who wish to include the corresponding apparel items in the store catalog 202 to enable sales of the items via the store web sites 201. Most sellers may typically provide the values of such important attributes, which may be referred to as "head" attributes 240 or primary attributes in some embodiments because of their relative importance. In at least some cases, however the sellers may provide incomplete item information, e.g., missing some of the other attributes, in their submissions directed to the store and its catalog 202. These other attributes such as example attributes 210-216 shown in FIG. 2 may be referred to as "tail" attributes 241 or non-primary attributes. In some embodiments, the operators of the store web sites 201 may not wish to simplify or reduce the effort involved in submitting items for inclusion in the catalog, instead of necessarily forcing the sellers 221 to provide all relevant attribute values, which may lead to a better user experience for sellers.

While sellers 221 may sometimes omit values for some tail attributes, customers 222 (e.g., 222A or 222B) of the store web sites 201 may nevertheless wish to know the values of one or more of the missing tail attributes of an item before making a decision regarding purchasing the item. The customers 222 may sometimes search for items based on tail attribute values, e.g., using a search engine 290 associated with the store web sites 201. As such, it may be important for the operators of the store web sites 201 to obtain the missing attribute values.

In various embodiments, one or more trusted auxiliary data sources 227 (such as 227A or 227B) may be identified, which may contain at least some of the attribute values missing from the submissions of the sellers. For example, auxiliary data source 227A may comprise a web site of Manufacturer A of apparel items, while auxiliary data source 227B may comprise a web site of Manufacturer B of apparel items. A manufacturer's web site may be considered a trusted source of information about the manufacturer's products or items in at least some embodiments. An analytics service 225, similar in features and functionality to analytics service 102 of FIG. 1, may for example utilize weakly supervised learning techniques (i.e., machine learning techniques based on the analysis of weak or non-conclusive signals) of the kind discussed earlier in the depicted example scenario to extract missing attribute values from the trusted auxiliary data sources 227. The target corpus in the depicted example scenario may include the publicly-accessible contents of the auxiliary data sources 227, and the knowledge base may comprise a portion or all of the catalog 202.

Example High-Level Workflow

Figure 3:
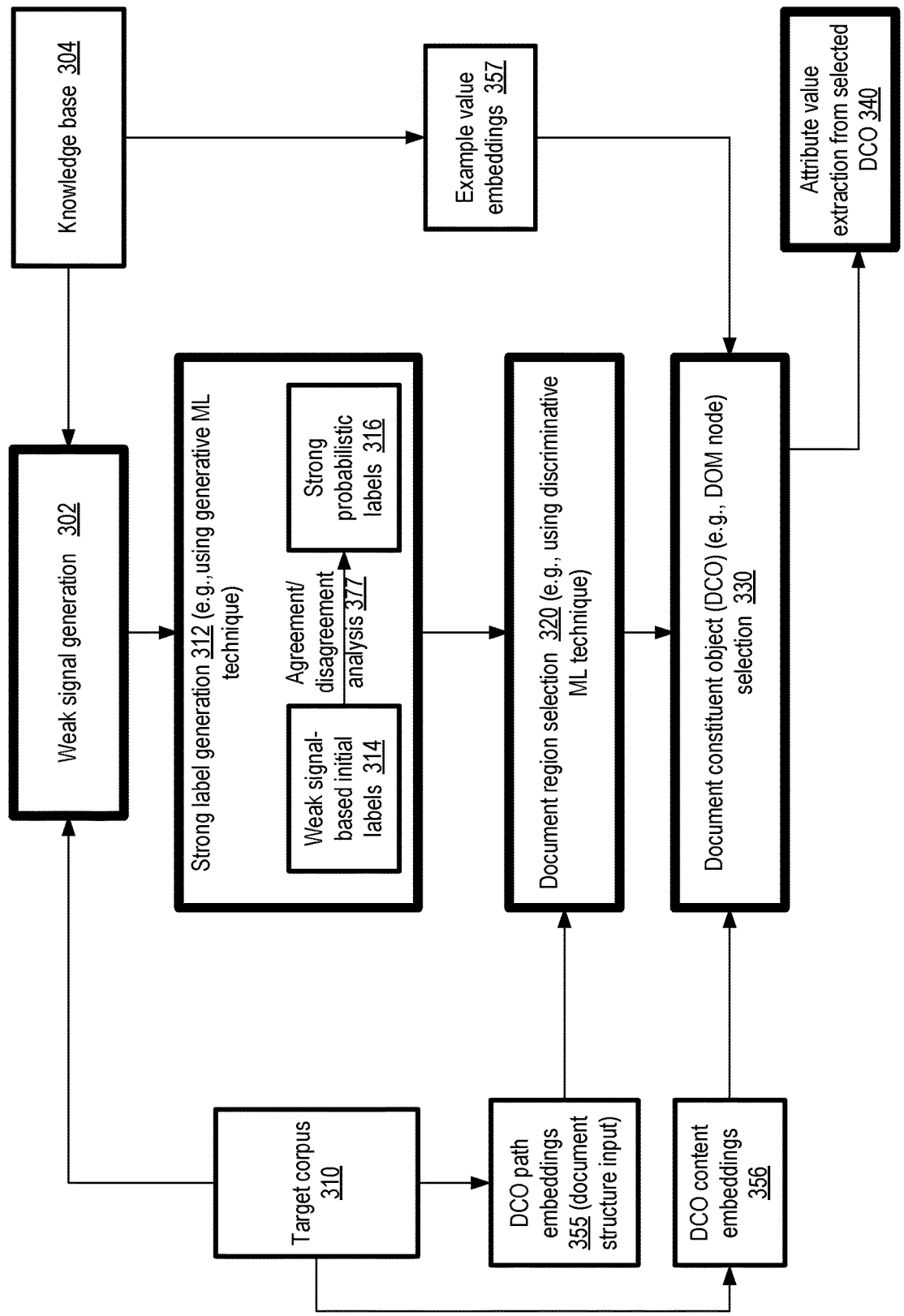
FIG. 3 illustrates a high level workflow for extracting attribute values, according to at least some embodiments.

FIG. 3 illustrates a high level workflow for extracting attribute values, according to at least some embodiments. The steps of the high level workflow may include weak signal generation 302, strong label generation 312, document region selection 320, and document constituent object (DCO) selection 330, followed by attribute value extraction from the selected DCO 340.

In various embodiments, the inputs to the high level workflow may comprise an indication of a target corpus 310 (from within which values of target attributes of interest are to be extracted) and a knowledge base 304 (containing example known values of various of attributes of the kinds of entities for which attribute extraction is to be performed). If the problem domain being addressed involves apparel items as discussed in the context of FIG. 2, for example, the target corpus 310 may include the web sites of apparel manufacturers, while knowledge based 304 may comprise records or tuples indicating, the titles of various items, the manufacturers of the items, and values of various tail attributes which have already been determined (e.g., either as a result of earlier automated attribute extraction operations, or because some sellers have provided the values).

Using a combination of knowledge base records and analyzed portions of the target corpus, a set of automated voting rules for generating weak or non-definitive signals of the presence of missing attribute values may be identified in the depicted embodiment. These rules, which may differ from one attribute to another, may then be applied to at least a selected portion of the target corpus to obtain an initial label matrix or data structure, as part of the weak signal generation 302. For example, if the value of a tail attribute for an item of a manufacture M1 is to be obtained, the portion of the target corpus which contains M1's web site pages may be evaluated for weak signals. Entries of such an initial label matrix may in effect represent the votes cast by various automated rules with respect to whether a given constituent object (e.g., a DOM node) of a document (e.g., a web page) contains a value of an attribute or not.

The weak signal-based initial labels 314 (e.g., entries of the initial label matrix) may be provided as input to the strong label generation 312 in the depicted embodiment. An agreement/disagreement analysis 377 may be performed on the weak signal-based initial labels, e.g., using one or more statistical techniques or machine learning models. A set of strong probabilistic labels 316 corresponding to the individual document constituent objects (DCOs) may be obtained based on the agreement/disagreement analysis 377. For example, if numerous weak signals all cast "yes" votes indicating that the value of the targeted attribute is likely to be in a particular DCO DCO1, a probability label closer to 1 may be chosen for DCO1, while if only a few weak signals all cast "yes" votes indicating that the value of the targeted attribute is likely to be in another DCO DCO2, a probability label closer to 0 may be chosen for DCO2. The step of converting the automatically generated weak labels to strong probabilistic labels using a machine learning model may represent one example of a generative machine learning technique.

After the strong probabilistic labels 316 have been generated, a discriminative machine learning technique may be used for document region selection 320 in the depicted embodiment. In this step, a machine learning model (such as a logistic regression model) may be used to select, from within a given document whose DCOs have been assigned the strong probabilistic labels with respect to the presence of a value of a target attribute, one or more subsections or portions which are considered most likely to contain valid values of the target attribute. The training data set of such a model may include embeddings generated for respective DCO paths, with the paths being identified according to the content model used for structuring the documents of the target corpus 310, as well as the strong probabilistic labels 316. The output of such a document region selection model may indicate, for each document portion, an indication of how whether the portion is predicted to contain the attribute value. Thus, for example, the document region selection model may identify a particular table within a web page as a likely location for the attribute, without necessarily selecting a particular row within the table. The DCO path embeddings 355 may represent an example of the use of document structure input to narrow down the location of target attribute values.

From the document regions or portions for which high probabilities of containing target attributes have been predicted, the particular DCO (e.g., a DOM node in the case of web pages) which is most likely to contain the target attribute value may be identified using a ranking technique in DCO selection 330 step in various embodiments. Input to this step may include two sets of embeddings: example value embeddings 357 of the target attribute, as well as DCO content embeddings 356. Similarity analysis may be performed between the two types of embeddings, and the DCO whose embedding representation is found to be most similar to the embeddings of known examples of the attribute value may be selected as the DCO from which the value of the targeted attribute should be extracted. Consider a trivial example scenario in which the target attribute represents the fabric mix of an apparel item, and the example values in the knowledge base include "100% cotton", and "90% cotton, 10% wool", and "85% polyester, 15% cotton". If one of the DCOs (DCO1) selected from a target corpus document contains the content "70% cotton, 30% polyester", and another DCO (DCO2) contains the content "100% satisfaction guaranteed", the embedding of DCO1 may be found to be much more similar to the embeddings of the example values than the embedding of DCO2 (despite the presence of the percent symbol in both DCOs), so DCO1 may be selected as the object from which the fabric content should be extracted. The final step of the workflow of FIG. 3 comprises attribute value extraction from the selected DCO 340.

Methods for Automated Attribute Extraction Using Weak Signals

Figure 4:
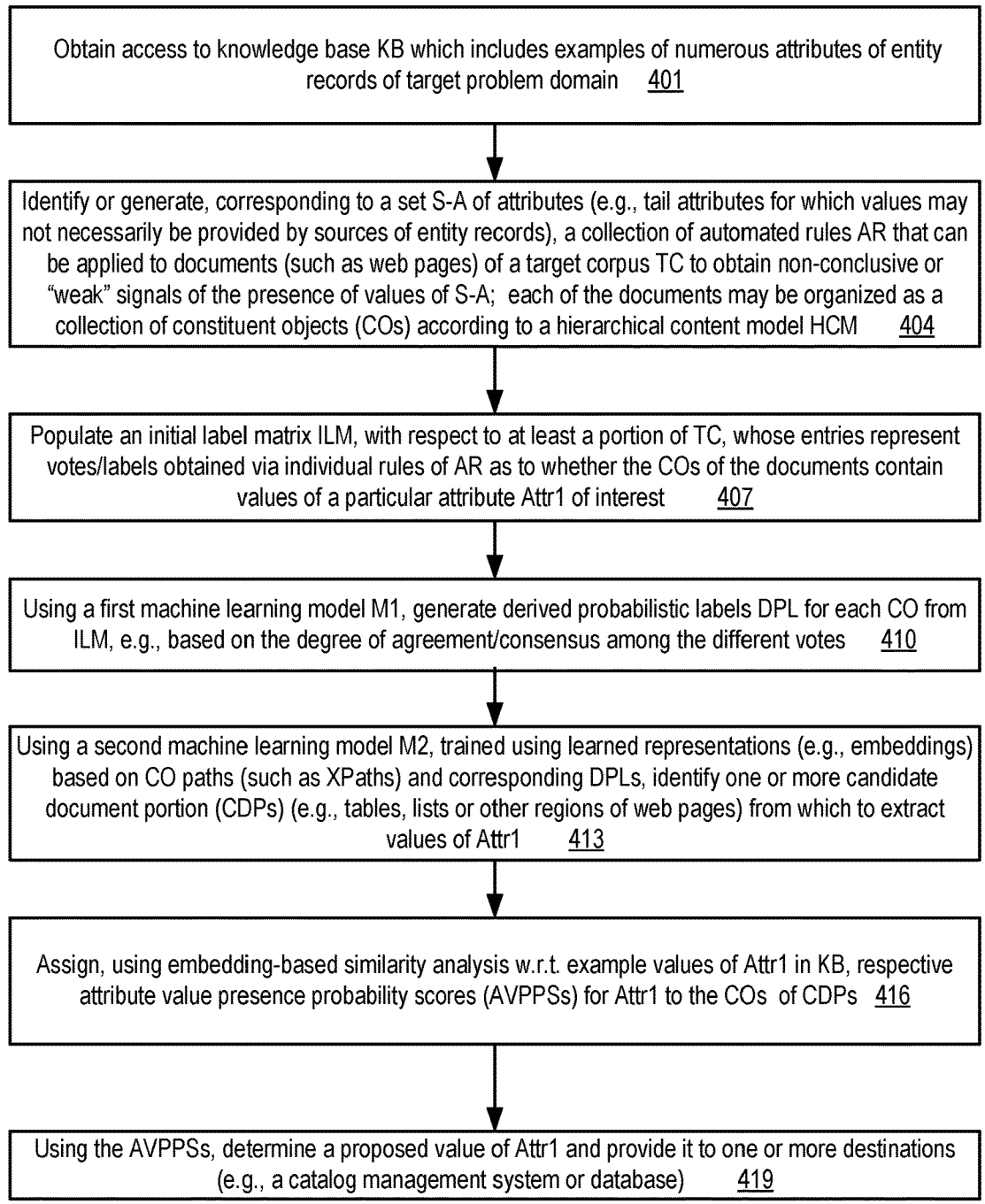
FIG. 4 is a flow diagram illustrating aspects of operations that may be performed to extract attributes from target documents, according to at least some embodiments.

FIG. 4 is a flow diagram illustrating aspects of operations that may be performed to extract attributes from target documents, according to at least some embodiments. As shown in element 401, access to a knowledge base (KB) which includes examples of numerous attributes of entity records pertaining to a particular target problem domain (such as filling out incomplete catalog records of a store) may be obtained, e.g., via programmatic interfaces of an analytics service similar in features and functionality to analytics service 102 of FIG. 1.

Corresponding to a set S-A of attributes of the entity records, a collection of automated rules AR that can be applied to documents of a target corpus (TC) to obtain non-conclusive or weak signals of the presence of values of S-A may be identified (element 404) in various embodiments. The S-A attributes may include tail or non-primary attributes of the kind shown in FIG. 2 in at least some embodiments. The target corpus may comprise documents of various types, such as web pages. At least some of the documents may be organized as a respective collection of constituent objects (e.g., DOM nodes) organized according to a hierarchical content model HCM. The use of the HCM for structuring the documents may enable the determination of the paths of the document COs via standardized APIs or tools, for example. Individual automated rules may not be definitive about the presence of a target attribute; instead, a given rule for a given attribute may only in effect represent a vote, which can be negated by contrary votes of other rules.

An initial label matric ILM may be populated with respect to at least a portion of TC identified as relevant for extracting a particular attribute's (e.g., Attr1's) value (element 407) in the depicted embodiment. The entries of the ILM may represent the weak signals, initial labels or votes obtained via respective automated rules, as to whether the COs of the documents of the TC contain values of Attr1. Using a first machine learning model M1, derived probabilistic labels (DPLs) may be generated for each CO from the ILM, e.g., based on an analysis of the extent of agreement/consensus among the different votes in the ILM for that CO (element 410) in various embodiments.

Having generated the DPLs, a second machine learning model M2 may be trained and used to identify one or more candidate document portions (CDPs) of a particular TC document (or several TC documents) which are likely to contain an Attr1 value in some embodiments (element 413). To train M2, a training data set which includes learned representations or embeddings based at least in part on CO paths (such as XPaths) and corresponding DPLs may be prepared. Examples of document portions which may be predicted to contain Attr1 values with a high probability may include tables, bullet lists and the like.

Using embedding-based similarity analysis between example values of Attr1 (obtained from the KB) and the content of various COs in the CDPs, respective attribute value presence probability scores (AVPPSs) may be assigned to individual constituent objects (element 416). The constituent objects may be ranked relative to one another in the depicted embodiment using the scores., and a proposed value of Attr1 may be extracted by parsing (if needed) the content of a highly-ranked object (element 419). The proposed value of Attr1 may be provided to one or more destinations, e.g., a catalog management system or a database management system in some embodiments. It may sometimes be the case that multiple conflicting values of Attr1 may be found—e.g., if the AVPPSs of multiple COs are identical or very close to one another. In such a scenario, in one embodiment the conflicting values may be transmitted for manual analysis to one or more domain experts, and the domain experts may select the particular Attr1 value which is to be considered valid.

Example Categories of Weak Signals

Figure 5:
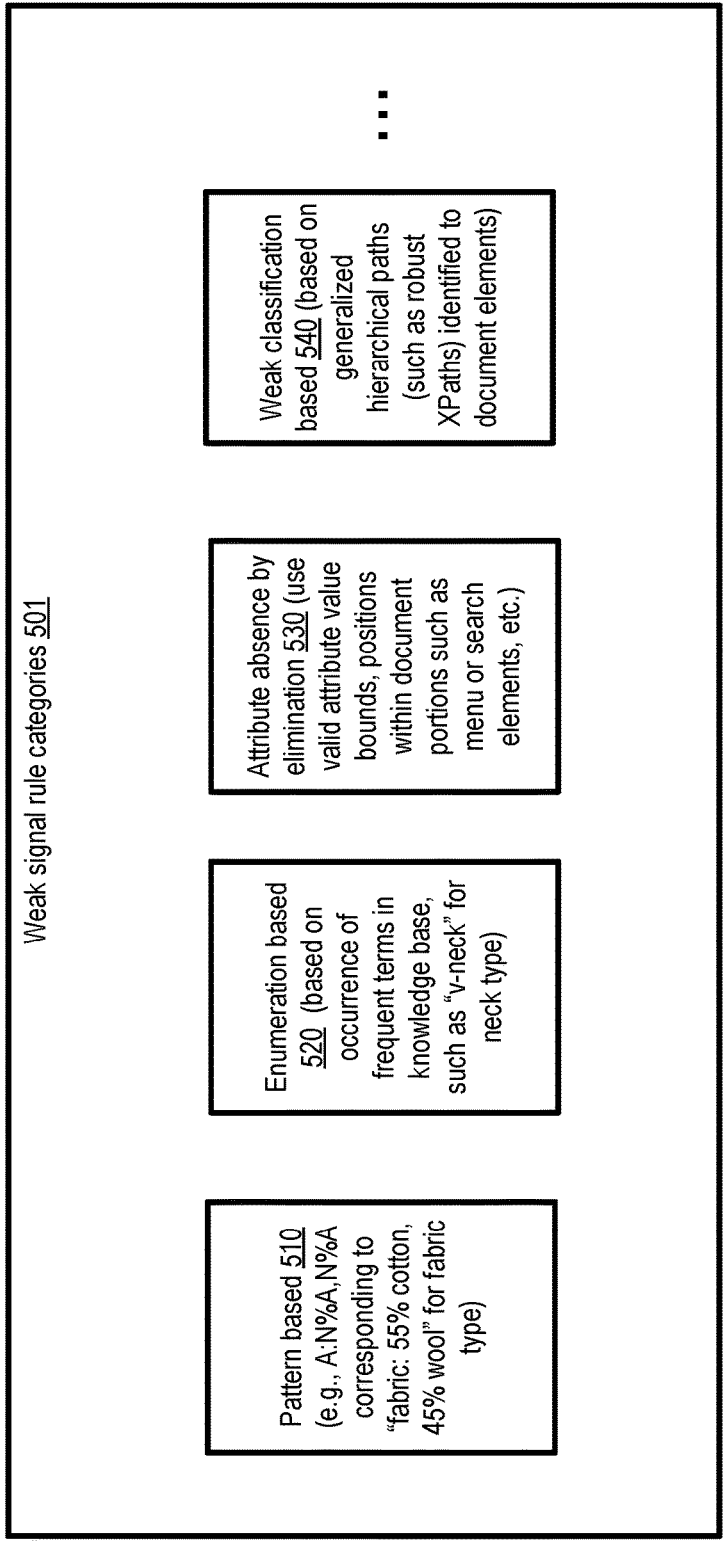
FIG. 5 illustrates example categories of weak signal rules pertaining to the presence of attribute values within documents, according to at least some embodiments.

FIG. 5 illustrates example categories of weak signal rules pertaining to the presence of attribute values within documents, according to at least some embodiments. As shown, weak signal rule categories 501 may include pattern-based 510, enumeration based 520, attribute absence by elimination 530, and weak classification based 540 categories in various embodiments. Weak signal rules may utilize data from the target corpus of interest, the knowledge base, or a combination of the target corpus and the knowledge base in various embodiments. At least some weak signal rules may be generated automatically in some embodiments, e.g., by rule generation programs of an analytics service similar in features and functionality to analytics service 102 of FIG. 1. In at least one embodiment, examples of target attribute values may be provided via programmatic interfaces by clients of an analytics service, and such examples may be used to identify or generate at least some of the rules.

Pattern-based rules 510 may exploit commonality of syntactic patterns in the attribute value examples available in the knowledge base. The intuition behind such rules is that if attribute values in the knowledge base tend to be expressed using a particular pattern of numbers, symbols, text etc., then it is likely that similar sequences in the target corpus may also represent the attribute values. For example, in one implementation for identifying fabric content of apparel items, sequences of consecutive alphabet characters in a knowledge base attribute value may be represented by the letter A, a sequence of consecutive numerals may be represented by the letter N, and special characters may be left unchanged. The knowledge base example values may all be encoded using such an approach, and the mode of the distribution of the encoded patterns from the knowledge base may be identified. The string "fabric: 55% cotton, 45% wool" may thus be encoded as "A:N % A,N % A", for example. The mode may then be used to generate the following rule: if the encoding of a document constituent object (DCO) within the target corpus matches the mode, then a positive weak signal (e.g., a value of 1) of the presence of a value the fabric content attribute is to be generated for the DCO; otherwise, a neutral signal (e.g., −1 or null) indicating that neither a positive nor a negative decision could be reached using the pattern.

Enumeration based rules 520 may use examples of frequently-occurring terms in the knowledge base to flag DCOs in the target corpus as likely to contain the attribute value in the depicted embodiment. In one implementation, for example, the frequency distribution of values of a target attribute in the knowledge base may be computed, and those values whose frequency is greater than the mean of the distribution may be used to generate weak signals with respect to the target corpus. For example, for the attribute "neck style" for apparel items, the term "V-neck" may be very frequent in the knowledge base, so the presence of the term "V-neck" in a DCO of the target corpus may result in a weak positive signal for the neck style attribute.

Several different kinds of rules pertaining to attribute absence by elimination 530 may be employed in various embodiments to generate weak signals. Some such rules may be based on valid lower and/or upper bounds on values of the target attribute—for example, a "model identifier" attribute may have to be at least 2 characters in length, the value of a "count" attribute (e.g., indicating the number of packets of a food item) may be expected to be less than three digits long, and so on. Expected or valid values of such attributes may be obtained from the knowledge base, and one or more cut-off thresholds (e.g., lower bound only, upper-bound threshold only, or both lower and upper bound thresholds) may be set for the possible valid values in the target corpus. Positive votes may be generated only if the content of a DCO is within the expected bounds; if the content indicates an invalid value (one outside the valid bounds), a positive vote may not be generated.

Another kind of attribute absence related rule may be generated based on the expected uses of different types of sub-structures or regions of the documents of the target corpus in the depicted embodiment. For example, with respect to web pages, structural elements such as breadcrumbs, menus, search forms, and the like may typically be located above the title element of a web page containing details about an entity or item, while entity-specific information may typically be placed below the title. A set of weak signals that can classify negative examples (examples of the absence of the target attribute value) with high precision may be generated using rules equivalent to: "if the DCO is above the title of the web page, cast a negative vote".

Some attribute values available in the knowledge base may be viewed as annotations that can be matched with the content of the target corpus (in a form of distant supervision) for generating weak classification based rules 540. For example, the title attribute of an entity or item may be available in the knowledge base, and used as a way to identify (e.g., by approximate matching with the titles of documents in the target corpus) a few documents likely to contain similar content in the target corpus. Having thus weakly classified some of the target corpus documents using matching with respect to the knowledge base entries, a search for target attribute values (e.g., attribute values also present in the matched portion of the knowledge base) may be conducted within the weakly classified target corpus documents. If such target attribute values are found, the paths (e.g., XPaths) to the corresponding DCOs may be identified, and a generalized representation of the paths found may be constructed in at least some embodiments. For example, a wrapper induction tool designed in part to extract structured records from template-based web pages may be used to generate generalized or "robust" XPaths in one implementation. Such generalized paths may then be used to generate weak signals from other target corpus documents. For example, if a robust XPath and the actual XPath of a DOM node within a target corpus web page point to the same DOM node DN1, a positive vote may be cast for DN1. One example of a rule based on such generalized or robust XPaths may utilize predicates such as "//span[contains(., 'Zipper(Left)')]" for identifying apparent closure (e.g., zipper) related attributes. Other types of weak signal generation rules, not shown in FIG. 5, may be identified and used in various embodiments.

Figure 6:
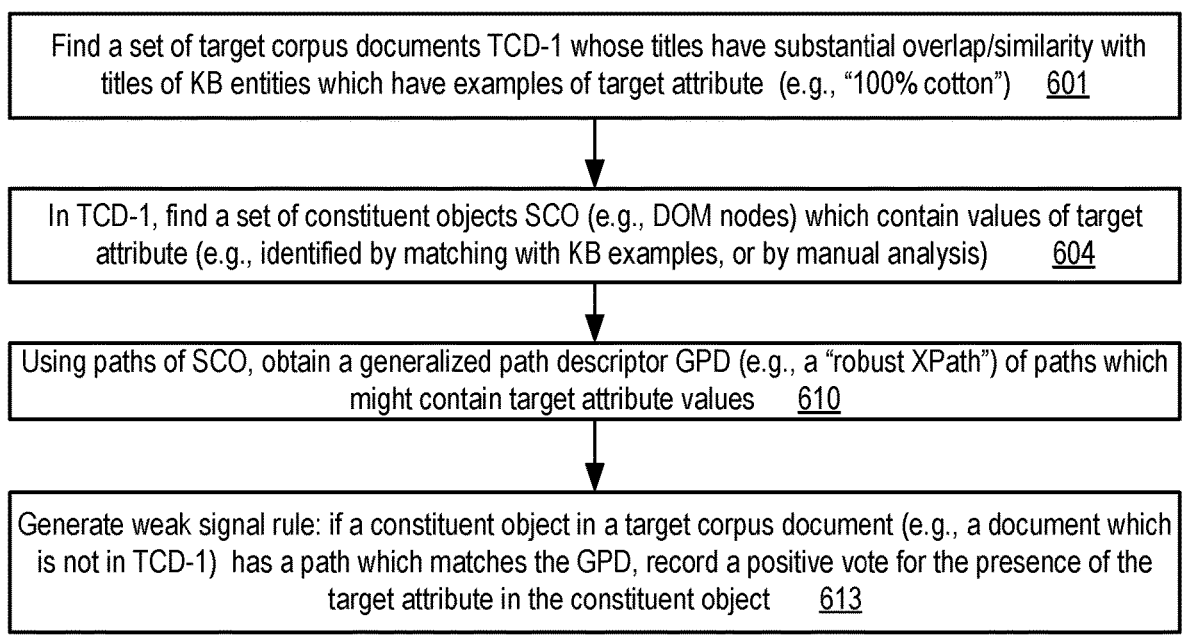
FIG. 6 is a flow diagram illustrating aspects of operations that may be performed to generate a weak classification based rule, according to at least some embodiments.

FIG. 6 is a flow diagram illustrating aspects of operations that may be performed to generate a weak classification based rule, according to at least some embodiments. As shown in element 601, a set of target corpus documents TCD-1 may be identified, whose titles have substantial overlap/similarity with titles of knowledge base entities which have examples of the target attribute of interest. For example, in the fabric content attribute example, titles T-K of entities whose knowledge base entries include values such as "100% cotton" may be found and matched with titles of target corpus documents to identify a set TCD-1 of documents with similar titles. In effect, the titles T-K may serve as weak classification hints for the documents of the target corpus, hence the designation "weak classification based rules".

Within TCD-1, a set of constituent objects SCO (e.g., DOM nodes in the case of web pages) may be identified which contain values of target attributes (element 604) in the depicted embodiment. In some cases such constituent objects may be identified in an automated manner, e.g., by matching the content of the objects with the example values of the target attributes in the knowledge base; in other cases, manual analysis of TCD-1 may be performed to identify the SCO.

From those documents in TCD-1 which are formatted or structured according to a hierarchical content model (HCM) (which may often include all the documents of TCD-1), the hierarchical paths to the objects of the SCO may be extracted in at least some embodiments. Using such paths, a generalized path descriptor GPD (such as a robust XPath) may be constructed (element 610), which is able to capture commonalities among the paths of the objects containing the target attribute values.

A weak signal generation rule of the following form may be constructed from the GPD for other documents of the target corpus (documents which are not in TCD-1) (element 613) in the depicted embodiment: if a constituent object in the document has a path which matches the GPD, record a positive vote for the presence of the attribute in that object. In effect, a characterization of likely object paths that contain the attribute value may be obtained, and then used to create positive votes for objects with similar paths within other documents.

Example Technique for Generating Strong Labels from Weak Signals

Figure 7:
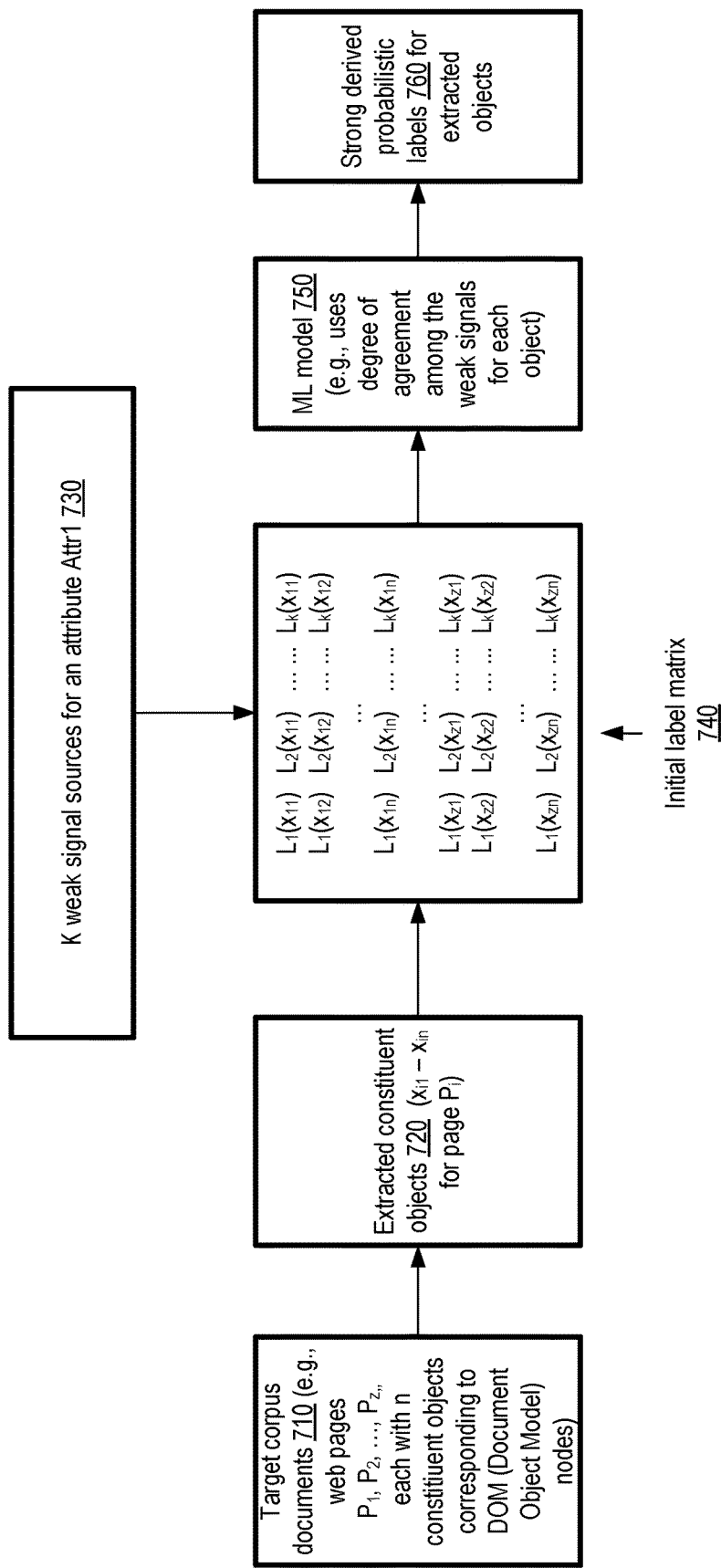
FIG. 7 illustrates an example technique for deriving strong probabilistic labels using weak signals, according to at least some embodiments.

FIG. 7 illustrates an example technique for deriving strong probabilistic labels using weak signals, according to at least some embodiments. In the depicted embodiment, a set of K different weak signal based initial label generators or weak signal sources 730 may be identified for a given attribute Attr1 whose values are to be extracted from a target document corpus 710. In the example scenario shown in FIG. 7, the target document corpus 710 may comprise a collection of web pages $P_1, P_2, \ldots P_z$ from one or more web sites. Based on the hierarchical content model used for the target corpus documents, a set of constituent objects 720 are extracted from each of the documents, e.g., DOM nodes $x_{i1}$-$x_{in}$ may be extracted from a given page $P_i$.

The automated rules for the K different weak signals may be executed or evaluated with respect to each of the constituent objects of each of the documents, obtaining an initial label matrix 740. A given row of the matrix 740 comprises K initial labels or votes ($L_k(x_{ij})$), generated by the respective K weak signal sources with respect to the $j^{th}$ object of the $i^{th}$ document. Thus, if there are n DOM nodes per web page, the first n rows of the matrix 740 comprise votes for each of the n nodes from each of the K sources for the $1^{st}$ web page, the next n rows of the matrix comprise votes for each of the n nodes from each of the K sources for the $2^{st}$ web page, and so on.

The initial label matrix 740 may be supplied as input to a machine learning model 750, which performs statistical analysis of the extent of agreement or disagreement among the K different weak signals for each object. In one implementation, an empirical overlap matrix Ô may be obtained from the initial label matrix. Ô may represent a noisy version of the true overlap matrix O computed from the latent vector representing the rescaled true accuracies of the initial labels. The problem of obtaining strong probabilistic labels 760 may then be formulated as a matrix factorization problem in such an implementation, which aims to recover the latent vector from the noisy and incomplete Ô using an ML model 750. The training of the ML model attempts to find the best low-rank matrix that approximates O^, and its objective function (expressed in terms of the Frobenius norm of the difference between O^ and O) may be minimized using stochastic gradient descent in such an implementation.

The ML model 750 may produce a respective strong probabilistic label 760 for each of the objects as output in the depicted embodiment, e.g., a real number between 0 and 1. A value closer to 1 indicates a higher probability of the corresponding object having a value of the target attribute, while a value closer to 0 indicates a lower probability of the corresponding object having a value of the target attribute. As discussed earlier, the strong probabilistic labels 760 may then be used for subsequent parts of the attribution extraction workflow in various embodiments.

Figure 8:
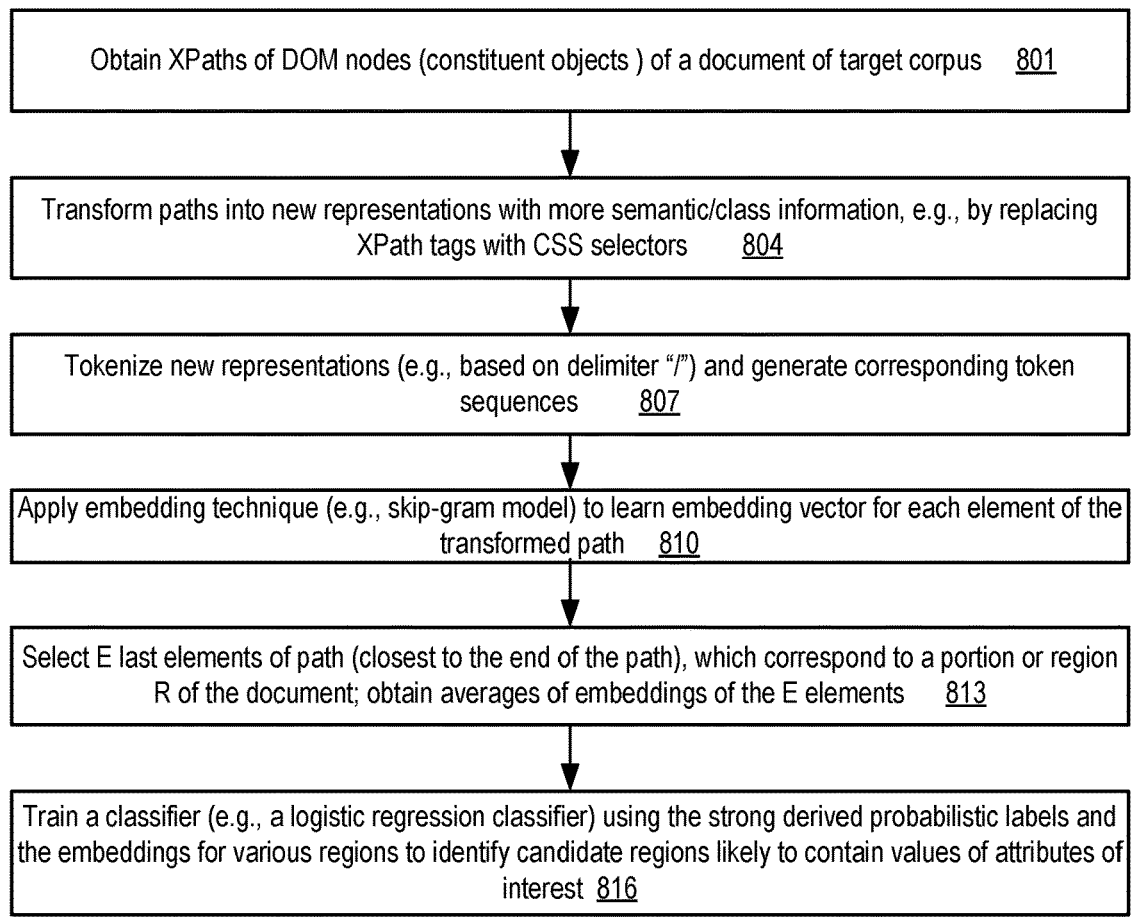
FIG. 8 is a flow diagram illustrating aspects of operations that may be performed to identify candidate regions for extracting attribute values in web pages structured according to the Document Object Model, according to at least some embodiments.

Example Technique for Identifying Candidate Document Regions for Extracting Attributes FIG. 8 is a flow diagram illustrating aspects of operations that may be performed to identify candidate regions for extracting attribute values in web pages structured according to the Document Object Model, according to at least some embodiments. As shown in element 801, the paths of the different constituent objects (DOM nodes) of a given document or web page of a target corpus (for which the probabilistic labels were generated) may be extracted, e.g., using any of various APIs or tools available for the DOM.

Each of the extracted paths may be transformed into respective new representations, e.g., representations containing more semantic information such as CSS class information in at least some embodiments (element 804). For example, XPath tags may be replaced with CSS selectors in one implementation. If the XPath of a particular list item DOM node on a web page of the target corpus comprises the following sequence of tags delimited by slashes: html/body/div[2]/div[1]/div[1]/div[2]/li[2], for example, that sequence of tags may be replaced in such an implementation with a corresponding sequence of CSS selector values, such as {js supports-sticky supports-hover/template-product/pageContainer/product_wrapper/−/productMeta_description/−}. In this transformed version, each element corresponds to the corresponding XPath tag; thus, for example, the html tag corresponds to js supports-sticky supports-hover, the body tag corresponds to template-product, and so on.

The transformed new representations for the different XPath tags may be tokenized (e.g., using the delimiter "/") and a corresponding sequence of tokens may be identified (element 807) in some embodiments. A skip-gram machine learning model (or a different embedding technique) may then be employed to learn a respective embedding vector corresponding to each transformed XPath tag in at least one embodiment (element 810). A set of E last elements of each of the paths may then be selected (where E is a tunable parameter or hyper-parameter), and an average of the embeddings of the E last elements (elements closest to the end of the path) may be obtained (element 813). The last E elements may represent a region R of the document, such as a table or bullet list.

A classifier (e.g., a logistic regression classifier) may then be trained, with a training data set comprising the average embeddings and the strong probabilistic labels derived using the technique described above for each of the XPaths in at least some embodiments (element 816). The output of the classifier may indicate whether a given region or subsection of a web page should be considered a good candidate with respect to extracting the targeted attribute value. Intuitively, the predictions of the classifier may be such that, if an actual target attribute value is present in an entry of a table, the model identifies the entire table as a good candidate; similarly, if an actual target attribute value happens to be indicated in a bulleted list, the entire bulleted list would be identified as a good candidate region. Such a methodology may be robust with respect to structural and positional variation among target corpus documents. Thus, for example, if the value of the target attribute is accessible from the 3rd row of a table in the top half of one web page, and from the 11th row of a semantically similar table placed in the bottom half of another web page, the model would identify both tables as candidates for extracting the target attribute value.

Example Technique for Ranking Constituent Objects within Candidate Regions

Figure 9:
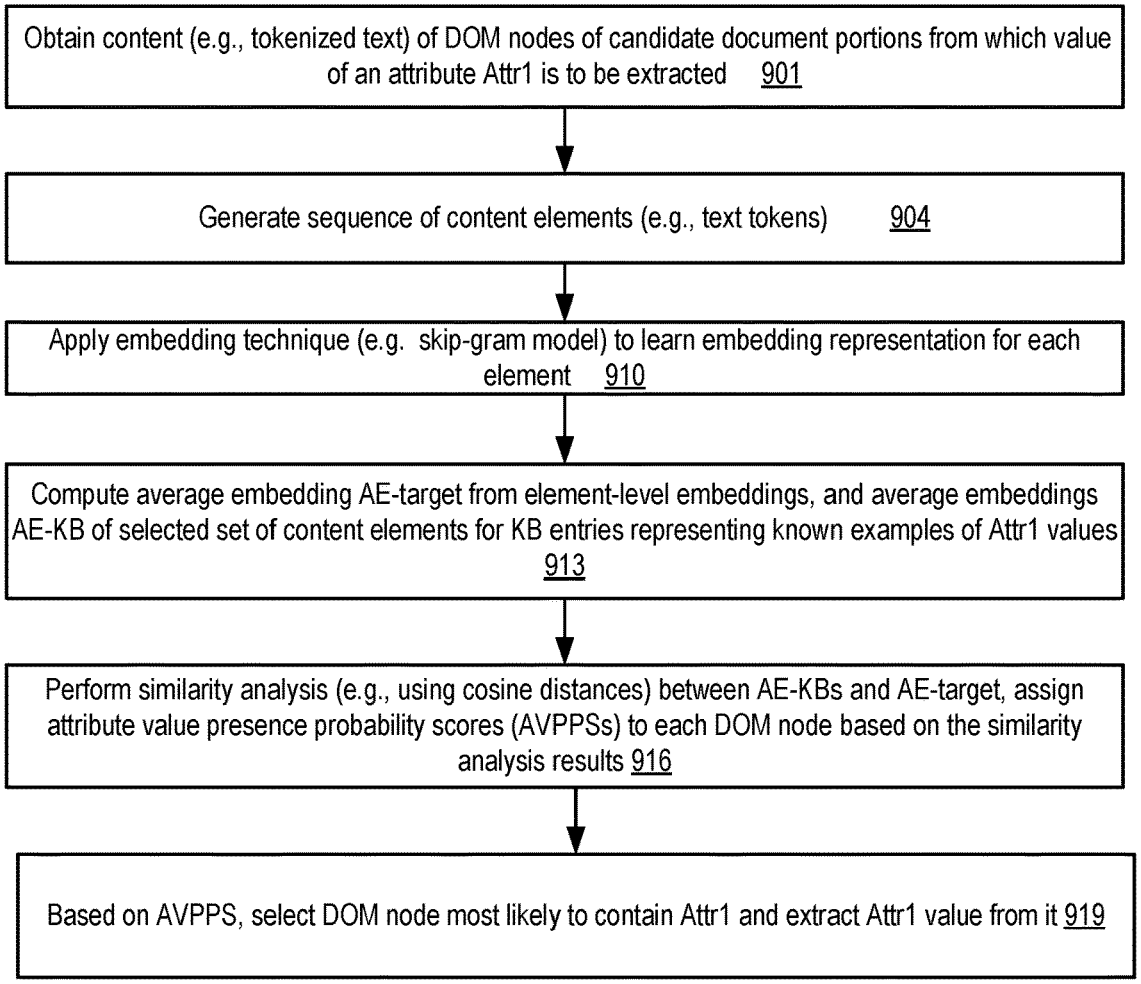
FIG. 9 is a flow diagram illustrating aspects of operations that may be performed to rank Document Object Model nodes of candidate regions of documents for extracting attribute values, according to at least some embodiments.

FIG. 9 is a flow diagram illustrating aspects of operations that may be performed to rank Document Object Model nodes of candidate regions of documents for extracting attribute values, according to at least some embodiments. As shown in element 901, the content (e.g., tokenized text) of one or more DOM nodes of a candidate document region or portion (which was identified as a candidate region using techniques similar to those discussed above in the context of FIG. 8) from which a value of a target attribute Attr1 is to be extracted may be read or obtained in various embodiments. A sequence of content elements (e.g., text tokens) may then be generated from the content of each of the DOM nodes (element 904).

A skip-gram machine learning model (or another embedding technique) may then be applied to generate respective learned embedding representations for each of the DOM node content elements in at least some embodiments (element 910). The average AE-target of the embeddings of all the content elements for a given DOM node may be computed (element 913). In addition, an average AE-KB of the embeddings (obtained using the same type of skip-gram model or embedding technique as was used for computing AE-target) of content elements of known examples of Attr1 values in the knowledge base may be computed in the depicted embodiment.

Similarity analysis may then be performed (e.g., using cosine distance as a metric) between AE-KBs and AE-target for each of the DOM nodes of the candidate region (element 916). Respective attribute value presence probability scores (AVPPSs) may then be assigned to each of the candidate region DOM nodes using the similarity analysis results, with those DOM nodes that are found most similar to the AE-KBs being assigned higher AVPPSs. Based on the AVPPS rankings, one of the DOM nodes may be selected as the node most likely to contain an Attr1 value, and the value may be extracted from it (e.g., after parsing the contents) (element 919) in the depicted embodiment. If two or more DOM nodes end up with identical AVPPSs, in some embodiments their contents may be analyzed manually to break the tie.

It is noted that in various embodiments, some of the operations shown in the flow diagrams of FIG. 4, FIG. 6, FIG. 8 and FIG. 9 may be implemented in a different order than that shown in the figure, or may be performed in parallel rather than sequentially. Additionally, some of the operations shown in FIG. 4, FIG. 6, FIG. 8 and FIG. 9 may not be required in one or more implementations.

It is also noted that although much of this description uses the W3C DOM as the example content model used for various steps of an attribute extraction workflow, the techniques described herein are not limited to any particular content model. Furthermore, while many of the examples discussed herein refer to web pages as examples of target corpus documents from, the techniques proposed would be equally successful if the target corpus contained other types of documents, such as files of a file system, objects stored in a cloud-based storage system, and the like.

Example Programmatic Interactions

Figure 10:
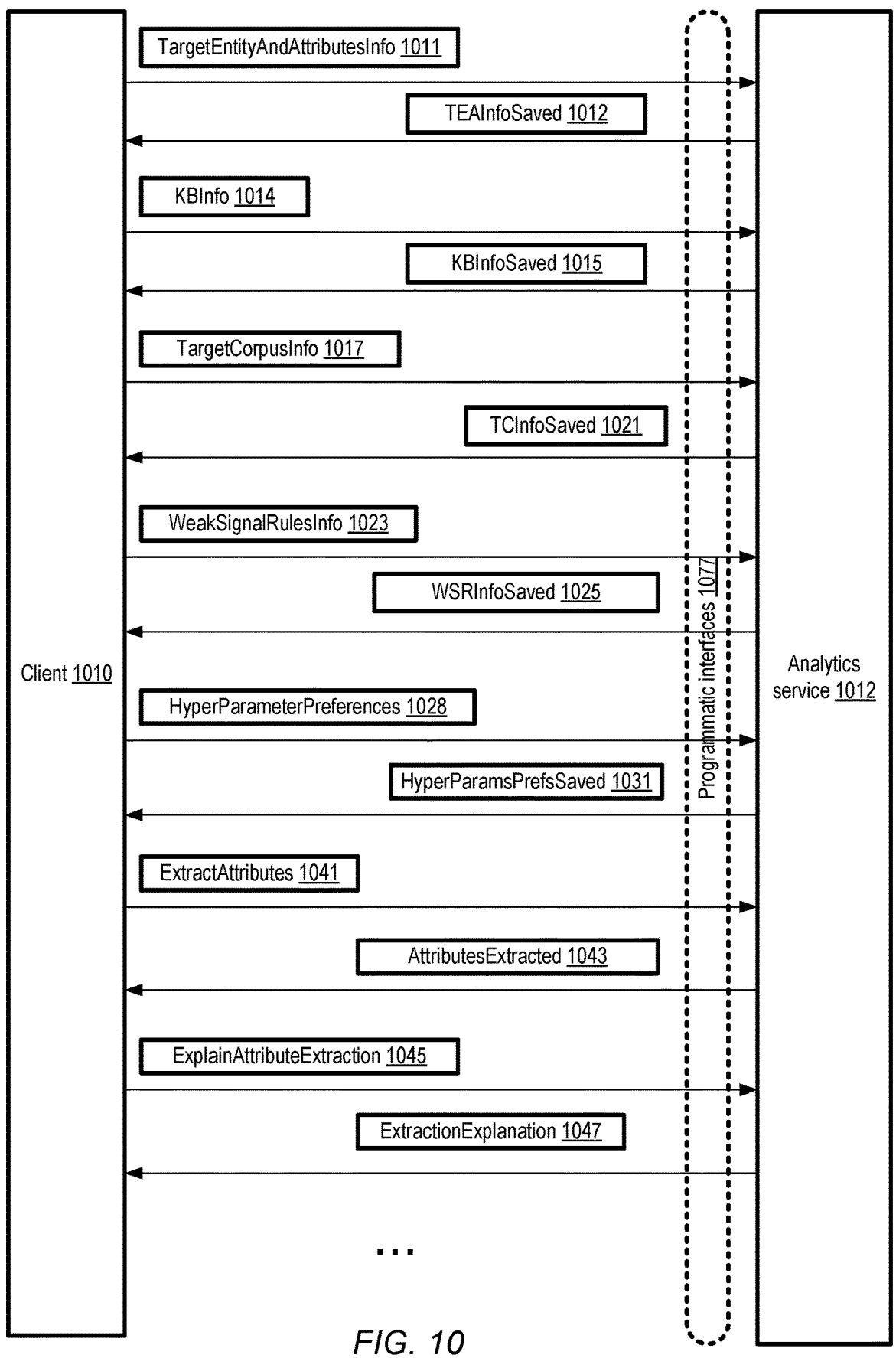
FIG. 10 illustrates example programmatic interactions pertaining to efficient automated attribute extraction, according to at least some embodiments.

FIG. 10 illustrates example programmatic interactions pertaining to efficient automated attribute extraction, according to at least some embodiments. In the depicted embodiment, an analytics service 1012, similar in functionality to analytics service 102 of FIG. 1, may implement a set of programmatic interfaces 1077, such as one or more web-based consoles, APIs, command-line tools, graphical user interfaces and the like. Using the programmatic interfaces 1077, a client 1010 of the analytics service may send a TargetEntityAndAttributesInfo message 1011 in the depicted embodiment to the analytics service 1012, indicating the kinds of entities and the set of entity attributes whose values are to be extracted automatically with the help of the analytics service. The provided information may be stored, e.g., at a metadata repository of the analytics service, and a TEAInfoSaved message 1012 may be sent back to the client 1010 as an acknowledgement in some embodiments.

The client may provide information about the knowledge base to be used for the attribute extraction workflow, e.g., via a KBInfo message 1014 in some embodiments. The information provided may include, for example, a network address at which the knowledge base entries can be obtained, information about the APIs available to access the entries, credentials needed (if any), and so on. The knowledge base metadata provided may be stored at a repository of the analytics service, and a KBInfoSaved message 1015 may be sent to the client 1010.

Similarly, metadata about the target corpus from which attribute values are to be extracted may be provided by a client 1010, e.g., using a TargetCorpusInfo message 1017 in the depicted embodiment. The information provided about the target corpus may include, for example, one or more network addressed from which the target corpus can be obtained, an indication of the content model(s) used to structure the documents of the target corpus, information about the APIs/tools available to access the documents and their constituent objects, credentials needed (if any), and so on. The target corpus metadata provided may be stored at a repository of the analytics service, and a TCInfoSaved message 1021 may be sent to the client.

In some embodiments, a client 1010 may provide hints regarding various weak signals to be used for attribute extraction, such as specific example attribute values to be used to generate the rules, information about the document sections or regions less likely or more likely to contain the values, the different types of rules to be employed, and so on. Such weak signal information may be submitted in one or more WeakSignalRulesInfo messages 1023 in the depicted embodiment. In at least one embodiment, if desired, a client may actually specify rules to be used for the weak signals. In other embodiments, a client 1010 may let the analytics service generate the rules itself, without providing any hints or information other than the names of the target attributes, information about the knowledge base and the target corpus. If information about the weak signals is provided, it may be stored at a metadata repository of the analytics service, and a WSRInfoSaved message 1025 may be sent to the client in some embodiments.

According to one embodiment, a client may provide one or more hyper-parameters for the machine learning models used in the attribute extraction workflow via one or more HyperParameterPreferences messages 1028. Such hyper-parameters may include, for example, the loss functions to be employed, the number of ending path entries to be retained for embeddings in the technique for identifying candidate regions, the specific similarity analysis algorithm to be used for ranking the objects within candidate regions, dimensionality of various neural network layers in scenarios in which neural network-based models are employed, and so on. After the hyper-parameter preferences are stored at a repository, a HyperParamsPrefsSaved message 1031 may be sent to the client in such an embodiment.

A client may submit an ExtractAttributes request 1041 indicating the particular attributes and corresponding entities for which values are to be extracted in the depicted embodiment from a particular data corpus and knowledge base. In response, an instance of a workflow similar to that discussed in the context of FIG. 3 may be implemented in various embodiments. If values for the attributes can be found, they may be provided to the client in one or more AttributesExtracted response messages 1043 in the depicted embodiment. Note that it may sometimes be the case that a value of an attribute of an entity cannot be found in the target corpus, in which case the analytics service 1012 may inform the client that the value could not be determined definitively.

According to at least one embodiment, a client 1010 may wish to obtain the reasoning or justification for the value extracted for one or more attributes at the analytics service. An ExplainAttributeExtraction request 1045 may be submitted to the analytics service, indicating the entity, attribute and extracted attribute value for which an explanation is requested. In response, the analytics service 1012 may provide a list of reasons in the form of one or more ExtractionExplanation messages 1047, including for example a set if of positive weak signals obtained, the fraction of weak signals which agreed with one another, and/or the content of the candidate region from which the value was extracted.

It is noted that in some embodiments, programmatic interactions other than those shown in FIG. 10 may be supported by an analytics service 1012. In one embodiment, a client may submit a programmatic request to verify (and correct, if needed) values of one or more attributes of an entity, for example, so the kind of attribute value extraction procedure may be employed not just to fill out missing values but also to verify values supplied by a source such as an item seller. In at least one embodiment, some of the types of programmatic interactions shown in FIG. 10 may not be supported.

Example Provider Network Environment

Figure 11:
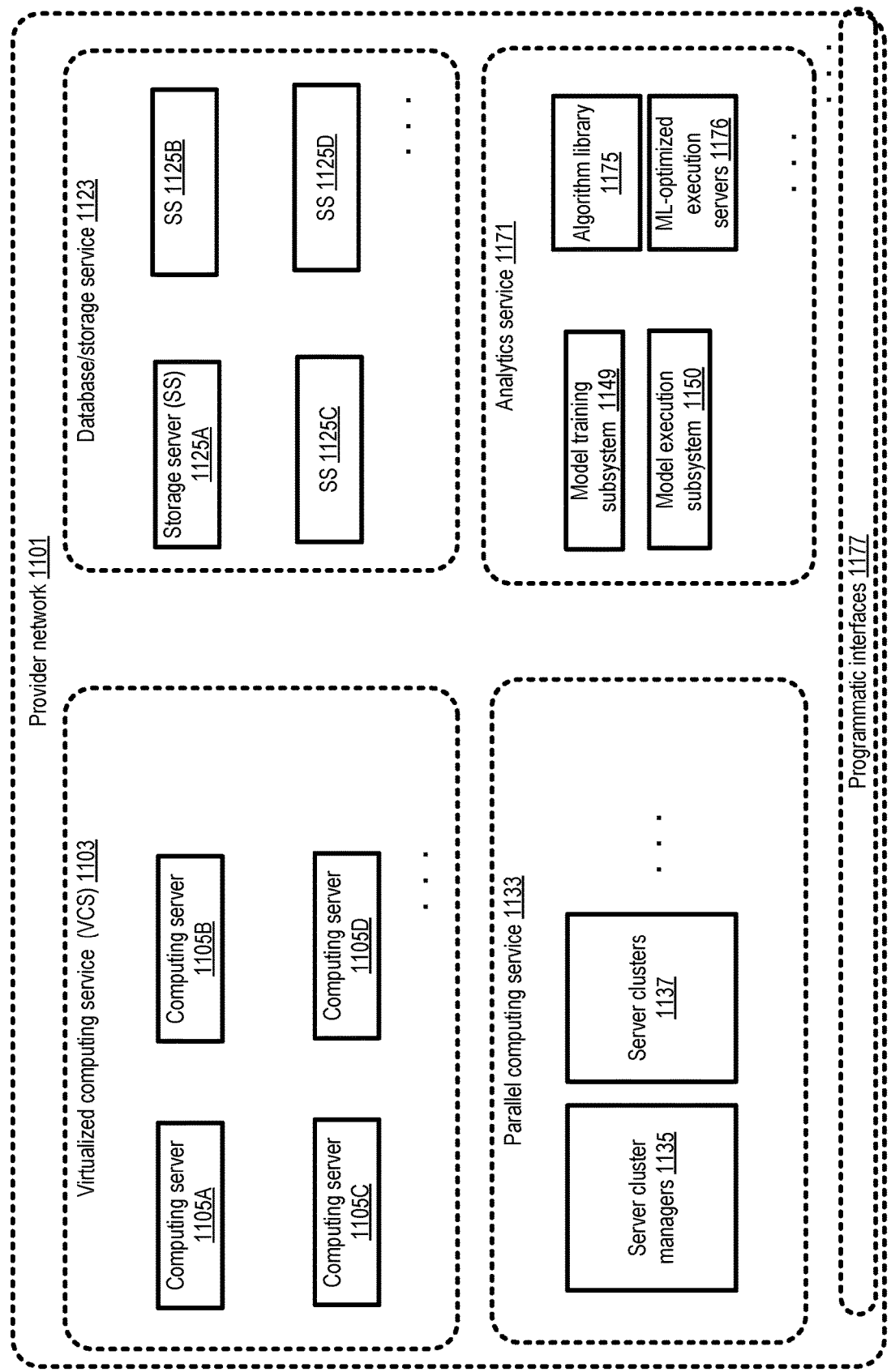
FIG. 11 illustrates an example provider network environment in which an analytics service used for attribute extraction may be implemented, according to at least some embodiments.

In some embodiments, as mentioned earlier, an analytics service at which meta-learning techniques similar to those described above are supported may be implemented at a provider network. FIG. 11 illustrates an example provider network environment in which an analytics service used for attribute extraction may be implemented, according to at least some embodiments. In the depicted embodiment, provider network 1101 may comprise resources used to implement a plurality of services, including for example a virtualized computing service (VCS) 1103, a database/storage service 1123, and a parallel computing service 1133 as well as an analytics/machine learning service 1171 within which meta-models may be developed and run. The analytics service 1171, which may also be referred to as a machine learning service or an artificial intelligence service, in turn may comprise algorithm library 1175, model training subsystem 1149 at which various candidate models may be trained and re-trained using algorithms from library 1175, model execution subsystem 1150 at which the models are executed, and machine learning-optimized execution servers 1176 in the depicted embodiment. The parallel computing service 1133 may comprise various server clusters 1137, each comprising a plurality of servers, on which parallelizable workloads may be distributed by a set of server cluster managers 1135 in the depicted embodiment. Some of the algorithms implemented at the analytics service 1171 may be parallelizable, and may utilize the server clusters 1137 in at least some embodiments. In one embodiment, for example, multiple instances of the machine learning models used in the attribute extraction workflow may be run in parallel to extract values of attributes for different entities, or values of different attributes of a given entity.

Components of a given service may utilize components of other services in the depicted embodiment—e.g., for some analytics service tasks, virtual machines implemented at computing servers such as 1105A—1105D of the virtualized computing service 1103 may be used, server clusters 1137 and/or cluster managers 1135 may be utilized for parallelizable computations of the analytics service, input data and/or output produced at the analytics service may be stored at storage servers 1125 (e.g., 1125A—1125D) of storage service 1123, and so on. Individual ones of the services shown in FIG. 11 may implement a respective set of programmatic interfaces 1177 which can be used by external and/or internal clients (where the internal clients may comprise components of other services) in the depicted embodiment.

In some embodiments, at least some aspects of the attribute extraction techniques described herein may be implemented without acquiring resources of network-accessible services such as those shown in FIG. 11. For example, a standalone tool or set of tools implemented at one or more computing devices which are not part of a network-accessible service may be used in one embodiment.

Use Cases

The techniques described above, of extracting missing values (or correcting erroneous values) of entity attributes, starting with a set of weak signal sources without requiring manual labeling or annotation, may be extremely helpful in a variety of environments. For example, many industrial-scale applications, such as catalog management applications of large stores which sell millions of items, may have extremely large and dynamically expanded catalogs, with a high degree of heterogeneity with respect to completeness and accuracy in the submissions of catalog entries. For such applications, it may be critical to fill out the missing or incorrect information provided by the sources of the catalog records as quickly as possible, e.g., to help end users identify the items whose attributes match their needs. Using the proposed methodology, valid values for missing or erroneous catalog entries may be identified efficiently, with no manual effort needed.

Illustrative Computer System

Figure 12:
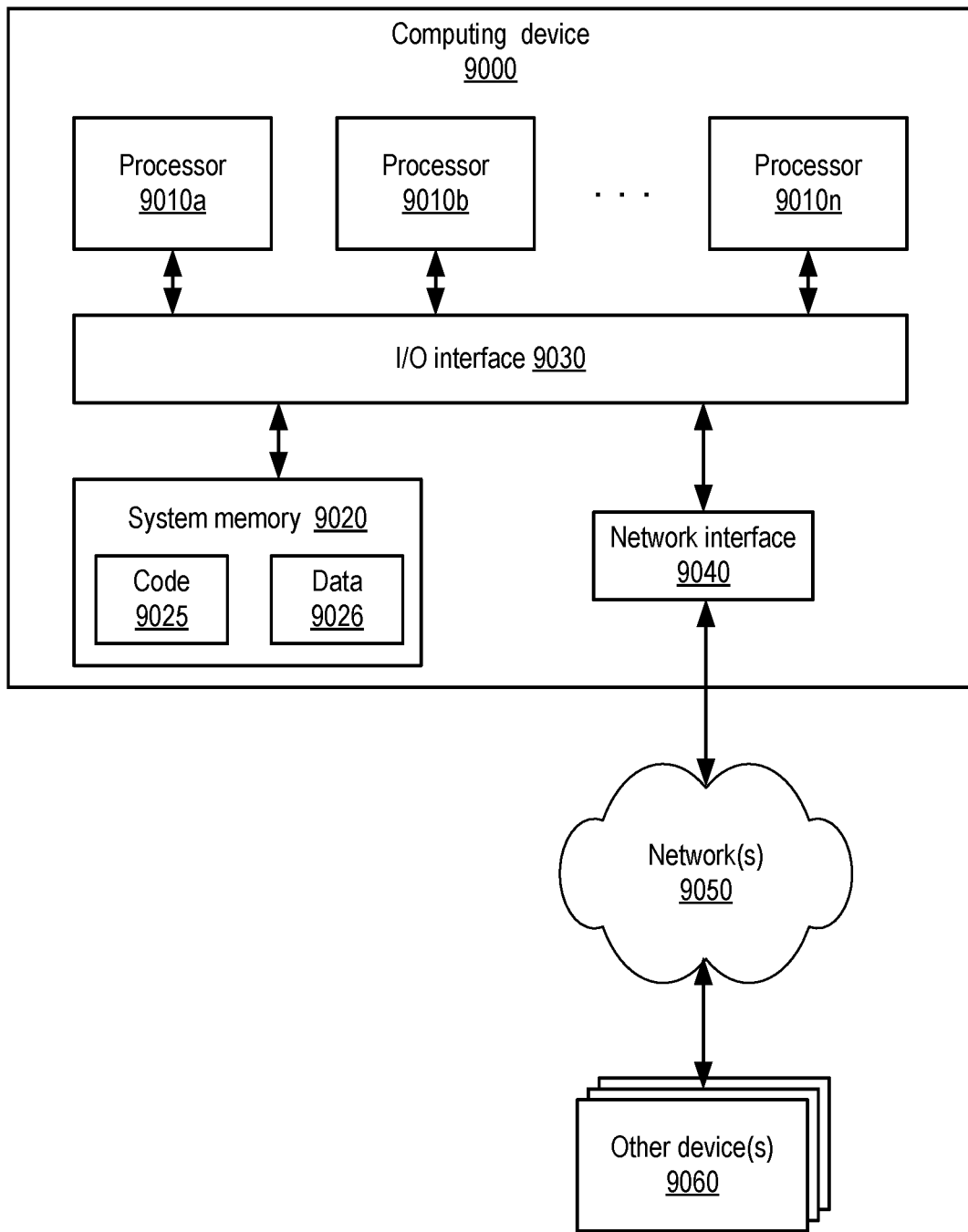
FIG. 12 is a block diagram illustrating an example computing device that may be used in at least some embodiments.

In at least some embodiments, a server that implements the types of techniques described herein (e.g., various functions of an analytics service), may include a general-purpose computer system that includes or is configured to access one or more computer-accessible media. FIG. 12 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 11, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 11. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 12 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

We claim:

1. A system, comprising:
   one or more computing devices;
   wherein the one or more computing devices include instructions that upon execution on or across the one or more computing devices cause the one or more computing devices to:
      obtain access to a knowledge base comprising a plurality of entries, wherein an individual entry of the plurality of entries comprises a value of one or more attributes of an entry of the plurality of entries;
      identify a plurality of automated rules to obtain respective non-definitive signals of a presence, within a target corpus comprising a plurality of web pages, of values of one or more attributes of entities not included in the knowledge base, wherein the knowledge base comprises one or more example values of the one or more attributes, wherein individual ones of the web pages comprise a respective set of constituent objects arranged according to a hierarchical content model, and wherein the plurality of automated rules comprises at least (a) a text pattern based rule and (b) an attribute absence indicator rule;
      populate, using at least a set of non-definitive signals obtained by applying the plurality of automated rules to at least a subset of web pages of the target corpus, an initial label matrix, wherein a particular entry of the initial label matrix indicates a proposed label associated with presence of a value of a particular attribute of an entity within a particular constituent object of a particular web page of the target corpus;
      generate, using a first machine learning model to which the initial label matrix is provided as input, a set of derived probabilistic labels, wherein an individual derived probabilistic label indicates a probability of a presence of a value of the particular attribute within a constituent object represented in the initial label matrix;
      utilize a second machine learning model to identify a particular region of a web page as a candidate region from which a value of the particular attribute can be extracted, wherein the second machine learning model is trained using a training data set comprising (a) embeddings obtained from respective paths, defined according to the hierarchical content model, of at least some constituent objects for which derived probabilistic labels were obtained and (b) the set of derived probabilistic labels;
      assign respective attribute value presence probability scores to individual ones of one or more constituent objects in the candidate region, based at least in part on a similarity analysis between embeddings of (a) one or more example values of the particular attribute which are present in the knowledge base and (b) content of the one or more constituent objects; and
      provide a proposed value for the particular attribute, wherein the proposed value is based at least in part on analysis of contents of a first constituent object selected from the candidate region, wherein the first constituent object is selected based at least in part on its assigned attribute value presence probability score.

2. The system as recited in claim 1, wherein the plurality of automated rules further comprises one or more of (a) an enumeration based rule and (b) a rule based on a generalized path identified for constituent objects within web pages.

3. The system as recited in claim 1, wherein the second machine learning model comprises a logistic regression based classification model.

4. The system as recited in claim 1, wherein the hierarchical content model comprises the Document Object Model (DOM) of the World Wide Web Consortium, and wherein the one or more computing devices include further instructions that upon execution on or across the one or more computing devices cause the one or more computing devices to:
   prepare the training data set of the second machine learning model, wherein preparing the training data set comprises transforming a path of a DOM node based on CSS (Cascading Style Sheets) selectors.

5. The system as recited in claim 1, wherein the one or more computing devices include further instructions that upon execution on or across the one or more computing devices cause the one or more computing devices to:
   obtain, via a programmatic interface of a network-accessible service of a provider network, a request for attribute extraction, wherein the proposed value of the particular attribute is provided in response to the request.

6. A computer-implemented method, comprising:
   identifying, based on a knowledge base of entities having examples of target attributes, one or more automated rules to generate signals associated with the presence, within a target corpus comprising a plurality of documents, of values of one or more attributes of entities, wherein individual ones of the documents comprise a respective set of constituent objects arranged according to a content model, and wherein the one or more automated rules comprise at least a text pattern based rule;
   applying the one or more automated rules on at least a subset of the target corpus to generate input to a first machine learning model;
   obtaining, from the first machine learning model, a set of derived probabilistic labels, wherein an individual derived probabilistic label specifies indicates a probability of a presence of a value of a particular attribute within a particular constituent object;
   training a second machine learning model to identify a candidate portion of a document from which to extract a value of the particular attribute, wherein a training data set used for the training comprises (a) the set of derived probabilistic labels and (b) learned representations obtained from respective paths, defined according to the content model, of at least some constituent objects for which derived probabilistic labels were obtained;
   assigning respective attribute value presence probability scores to individual ones of one or more constituent objects of the document in the candidate portion identified by the trained second machine learning model, wherein the assigning is based at least in part on a similarity analysis between learned representations of (a) one or more example values of the particular attribute which are present in the knowledge base and (b) content of the one or more constituent objects; and
   providing a proposed value for the particular attribute, wherein the proposed value is based at least in part on contents of a first constituent object selected from the candidate portion, and wherein the first constituent object is selected based at least in part on its assigned attribute value presence probability score.

7. The computer-implemented method as recited in claim 6, wherein at least a subset of the plurality of documents comprises one or more web pages.

8. The computer-implemented method as recited in claim 6, wherein the one or more automated rules include one or more of: (a) an enumeration based rule, (b) an attribute absence indicator rule, or (c) a rule based on a generalized path identified for constituent objects within documents.

9. The computer-implemented method as recited in claim 6, further comprising:
   obtaining, via a programmatic interface, one or more example documents of the target corpus, wherein individual ones of the example documents comprise a respective value of the particular attribute; and
   automatically generating, based at least in part on an analysis of the one or more example documents, at least one automated rule of the one or more automated rules.

10. The computer-implemented method as recited in claim 6, further comprising:
    obtaining an indication of a database comprising a plurality of entries, wherein an entry of the plurality of entries comprises a value of the particular attribute; and
    automatically generating, based at least in part on an analysis of the database, at least one automated rule of the one or more automated rules.

11. The computer-implemented method as recited in claim 6, wherein the one or more automated rules comprise a plurality of automated rules, and wherein said obtaining the set of derived probabilistic labels comprises:
    preparing an initial label data structure, wherein a particular entry of the initial label data structure indicates a proposed label associated, in accordance with a particular automated rule of the plurality of automated rules, with the presence of a value of the particular attribute within a particular constituent object of a particular document of the target corpus; and
    providing the initial label data structure as input to the first machine learning model, wherein the first machine learning model performs a statistical analysis of an extent of agreement among different automated rules of the plurality of automated rules to determine the set of derived probabilistic labels.

12. The computer-implemented method as recited in claim 6, further comprising:
    receiving, via a programmatic interface, a request to add a record representing an entity to a catalog, wherein the request indicates values of one or more attributes of the entity; and
    determining that the request does not include a value of the particular attribute, wherein the proposed value is obtained in response to said determining.

13. The computer-implemented method as recited in claim 6, wherein the second machine learning model comprises a classification model.

14. The computer-implemented method as recited in claim 6, wherein the content model comprises the Document Object Model (DOM) of the World Wide Web Consortium, the computer-implemented method further comprising:
    preparing the training data set of the second machine learning model, wherein preparing the training data set comprises transforming a path of a DOM node based on CSS (Cascading Style Sheets) selectors.

15. The computer-implemented method as recited in claim 6, wherein the learned representations obtained from the respective paths comprise learned vector embeddings, the computer-implemented method further comprising:
utilizing a skip-gram model to determine the learned vector embeddings.

16. One or more non-transitory computer-accessible storage media storing program instructions that when executed on or across one or more processors cause the one or more processors to:
identify, based on a knowledge base of entities having examples of target attributes, one or more voting rules to generate signals associated with the presence of values of one or more attributes of entities;
obtain from a first machine learning model, based at least in part on applying the one or more voting rules to at least a subset of a target corpus comprising a collection of documents to generate input to the first machine learning model, a set of derived probabilistic labels, wherein an individual derived probabilistic label specifies a probability of a presence of a value of a particular attribute within a constituent object of a particular document;
train a second machine learning model to identify candidate portions of documents from which to extract a value of a particular attribute, wherein the second machine learning model is trained using a training data set comprising (a) the set of derived probabilistic labels and (b) learned representations obtained from respective paths, defined according to a content model, of at least some constituent objects for which derived probabilistic labels were obtained; and
provide a proposed value of the particular attribute of a first entity, wherein the proposed value is based at least in part on contents of a first constituent object selected from a candidate portion of a document of the target corpus, wherein the candidate portion is identified using the trained second machine learning model, and wherein the first constituent object is selected from the candidate portion based at least in part on an assigned attribute value presence probability score.

17. The one or more non-transitory computer-accessible storage media as recited in claim 16, storing further program instructions that when executed on or across the one or more processors further cause the one or more processors to:
automatically generate at least one voting rule of the one or more voting rules based at least in part on analysis of one or more of: (a) a set of example values of the particular attribute or (b) a subset of the target corpus.

18. The one or more non-transitory computer-accessible storage media as recited in claim 16, wherein at least one voting rule of the one or more voting rules is based at least in part on one or more of: (a) a valid range of values of the particular attribute or (b) identifying a subsection of a document within which a value of the particular attribute is not expected to be included.

19. The one or more non-transitory computer-accessible storage media as recited in claim 16, wherein the content model comprises the Document Object Model of the World Wide Web Consortium, and wherein the one or more non-transitory computer-accessible storage media store further program instructions that when executed on or across the one or more processors further cause the one or more processors to:
prepare the training data set, wherein preparation of the training data set comprises (a) extraction of a set of DOM nodes and (b) transformation of respective paths of nodes of the set of DOM nodes.

20. The one or more non-transitory computer-accessible storage media as recited in claim 16, storing further program instructions that when executed on or across the one or more processors further cause the one or more processors to:
obtain an indication of a programmatic request for attribute extraction, wherein the proposed value of the particular attribute is provided in response to the programmatic request.

* * * * *